US011230835B1

(12) United States Patent
Lang et al.

(10) Patent No.: US 11,230,835 B1
(45) Date of Patent: Jan. 25, 2022

(54) FLOW CONTROL DEVICE FOR A STORM WATER MANAGEMENT SYSTEM

(71) Applicant: Lane Enterprises, Inc., Camp Hill, PA (US)

(72) Inventors: Timothy Joel Lang, Forest Hill, MD (US); Kevin Marshall Miller, Spring, TX (US)

(73) Assignee: Lane Enterprises, Inc., Camp Hill, PA (US)

( * ) Notice: Subject to any disclaimer, the term of this patent is extended or adjusted under 35 U.S.C. 154(b) by 231 days.

(21) Appl. No.: 16/052,873

(22) Filed: Aug. 2, 2018

Related U.S. Application Data

(60) Provisional application No. 62/542,398, filed on Aug. 8, 2017.

(51) Int. Cl.

| | |
|---|---|
| *F16K 31/22* | (2006.01) |
| *F16K 31/26* | (2006.01) |
| *F16K 31/30* | (2006.01) |
| *E03F 1/00* | (2006.01) |
| *F16K 21/00* | (2006.01) |

(52) U.S. Cl.
CPC .............. *E03F 1/00* (2013.01); *F16K 21/00* (2013.01); *F16K 31/22* (2013.01); *F16K 31/26* (2013.01); *F16K 31/30* (2013.01)

(58) Field of Classification Search
CPC .......... F16K 31/26; F16K 31/22; F16K 31/30; F16K 31/18

USPC ............. 405/96, 97; 137/397, 398, 409, 434
See application file for complete search history.

(56) References Cited

U.S. PATENT DOCUMENTS

| | | | | |
|---|---|---|---|---|
| 1,522,082 | A | * | 1/1925 | Ruths ....................... F01K 1/00 |
| | | | | 137/12 |
| 1,603,654 | A | * | 1/1925 | Weisgerber |
| 1,703,166 | A | * | 2/1929 | Penniman, Jr. ......... F01B 25/00 |
| | | | | 137/181 |
| 3,287,917 | A | * | 11/1966 | Lawrence ............... E02B 7/205 |
| | | | | 405/97 |
| 9,290,923 | B1 | | 3/2016 | Lang et al. |
| 9,309,989 | B1 | | 4/2016 | Lang et al. |

* cited by examiner

*Primary Examiner* — Sunil Singh
(74) *Attorney, Agent, or Firm* — Hooker & Habib, P.C.

(57) ABSTRACT

A storm water management system includes a flow control device that includes a float in a storage chamber responsive to changes in water level and a valve disposed between the storage chamber and a discharge. The valve includes a relatively movable valving member connected to the float and a fixed valving member. Each valving member has a through opening that receives storm water flowing between the storage chamber and the discharge. The through-openings overlap one another whereby relative displacement of the valving members caused by float movement defines a variable-sized orifice between the storage chamber and the discharge that regulates the discharge rate of storm water from the system. The shapes of the overlapping openings enable the valve to closely follow the ideal output hydrograph and maximize the discharge rate as a function of storm intensity, thereby minimizing the required volume of the storage chamber.

35 Claims, 16 Drawing Sheets

FLOW CONTROL DEVICE FOR A STORM WATER MANAGEMENT SYSTEM

RELATED APPLICATION

This application claims priority to and the benefit of U.S. Provisional Patent Application Ser. No. 62/542,398 "Flow Control Device for a Storm Water Management System" filed Aug. 8, 2017, which priority provisional patent application is incorporated by reference as if fully set forth herein.

FIELD OF THE DISCLOSURE

This disclosure relates to storm water management and in particular to a flow control device for a storm water management system.

BACKGROUND OF THE DISCLOSURE

Land development typically increases the peak flow rate of storm water runoff from a pre-development flow rate Q (cubic feet per second) as compared to a greater post-development peak flow rate Q'. A comparison of pre- and post-development hydrographs demonstrates not only the substantial increase in the peak flow rate from Q to Q', but also that the post-development peak flow rate occurs substantially earlier in the storm event.

Many jurisdictions require that storm water runoff from the boundary of developed land be managed so that the peak flow rate Q' for a specific rain event (for example, a particular storm such as a two-year storm or for a number of design storms) does not exceed the pre-development peak flow rate Q.

A jurisdiction may allow the peak flow rate Q' to increase as a function of storm intensity. As storm intensity increases from one design storm to the next design storm, the peak flow rate Q' increases as well.

A two-year storm at a given geographical location for example may require 2.91 inches of rainfall in a 24-hour period, a five-year storm 3.68 inches of rainfall in a 24-hour period, a ten-year storm 4.35 inches of rainfall in a 24 period, and a twenty-five year storm 5.40 inches of rainfall in a 24 period. Storm intensity data is available from state government agencies and from the US government's National Oceanic and Atmospheric Administration's National Weather Service Hydrometeorological Design Studies Center (which provides an online Precipitation Frequency Data Server (PFDS)).

A storm water management system manages storm water runoff from developed land. FIG. 31 schematically illustrates in simplified form a storm water management system 310. Storm water runoff is received into a storage chamber 312 via a storm drain 314. Access to the interior of the storage chamber may be provided through a manhole (not shown). The storage chamber is fluidly connected to a discharge pipe 316 that discharges water from the system. Fluidly connected between the storage chamber and the discharge pipe is a flow control device illustrated as a valve 318. The valve may be entirely or partially located within the storage chamber or may be located outside of the storage chamber. The valve limits the discharges rate of the storm water discharged into the discharge pipe so as to not exceed the maximum discharge rate Q allowed by local regulation for a given storm event. This may involve a series of maximum discharge rates which are allowed for storms of different intensities.

During the period of the storm event in which the rate of storm water flow into the storage chamber exceeds the maximum allowable rate Q, the storage chamber stores the excess runoff for discharge later.

An ideal storm water management system minimizes the storage volume needed to store the excess runoff. An ideal storm water management system would initially discharge runoff at the same rate as the inflow rate into the system as allowed by regulation. The regulations may allow the discharge rate to increase with the intensity of the storm—a 5-year storm for example might have a higher allowable discharge rate than would a 2-year storm.

Typically, storm water management systems are allowed to initially discharge the maximum pre-development flow rate for the smallest design storm that is being regulated. As storm intensity increases, the system is allowed to progressively discharge the maximum pre-development flow rate for design storms of increasing intensity. This will be illustrated for a storm water management system that is allowed to discharge the maximum pre-development storm flow rate for a 2-year storm, then for a 10-year storm, and then for a 25-year storm. If the storm intensity increases beyond a 25-year storm, the storm water management system may reach full capacity and any excess storm water that cannot be stored in the system is discharged upon receipt into the system.

At the beginning of a storm event the illustrated storm water management system is allowed by regulation to discharge storm water at a maximum discharge rate equal to the pre-construction flow rate for a 2-year storm.

If the storm intensity increases beyond that of a 2-year storm the system's allowable maximum discharge rate steps up to the maximum pre-development storm flow rate for a 10-year storm.

If the storm intensity increases beyond that of a 10-year storm the system's allowable maximum discharge rate steps up to the maximum pre-development storm flow rate for a 25-year storm.

If the storm intensity increases beyond that of a 25-year storm, the storage chamber of the system may reach capacity. Excess storm water received into the system that cannot be stored is discharged at whatever rate it is being received into the system.

The number of design storms, the amount of rainfall associated with each design storm, and the maximum design storm a storm water management system must handle set out by regulation varies with geographical location and the needs of the jurisdiction. The maximum storm intensity is typically a 50-year storm or 100-year storm.

The ideal outlet hydrograph for a multi storm design is depicted in dashed lines in FIG. 18 (and described in further detail below), which is a graph of the progressive allowable discharge rates for a complete maximum storm event. When the maximum storm has been exceeded, say a 100 year or a 50 year storm depending on regulations, the system is allowed to discharge whatever it is receiving by means of an overflow weir or maximum waterline outlet.

Typical storm water storage system regulations require that for any phase of the storm event, the system must retain the volume of water that exceeds the pre-development discharge for that phase of the event. A typical storm water management system stores the excess rainfall. The total storage required for the system is calculated using the design storms required by regulation.

At any time during a storm event, the storm may abate and the allowed maximum discharge rate may be reduced as the storage chamber empties. For example, a system that experiences a 5-year storm will be allowed to first discharge up to the 2-year pre-development maximum flow at the start of the storm and then discharge at the 5-year pre-development maximum flow after the storm exceeds the 2-year storm. If the storm abates sometime after reaching the intensity of a 2-year storm, the allowable discharge rate when the storm abates will be the 5-year pre-development maximum rate but will decrease to the 2-year pre-development maximum rate as the storage chamber empties.

Storage volume can be reduced significantly if the discharge rate from the storm water system is designed so as to discharge at the maximum rate allowed by regulation for each phase of the storm. Compared to some conventional outlet design strategies, releasing the maximum flow rates allowable can reduce the size of the system by as much as 50%, with typical reductions of 35%

Storm water management systems often use a flow control device that includes a storage chamber to receive and store runoff. The storage chamber may be provided with a discharge orifice of fixed size to discharge the stored runoff from the storage chamber. The orifice is sized for a discharge rate of Q when the storage chamber is full. The discharge rate Q is often the maximum discharge rate allowed for the most severe storm subject to regulation.

Such storm water management systems do not approach the performance of an ideal storm water management system because they discharge water at a less than optimum rate when filling up. As a result, a storage system larger than the ideal storage system is required.

Other storm water management systems utilize multiple fixed orifices at different elevations or divert excess intake into other storage chambers. Although these systems may better approach the ideal system than a simple fixed orifice system, their performance may still be lacking or their costs and land use requirements are prohibitive for many projects.

Jurisdictions have begun allowing (or even requiring) the maximum discharge rate to be "stepped", that is, allowing the maximum discharge rate to match the pre-development discharge rate as a function of storm severity or intensity for several different design storms. For example, a jurisdiction might allow a maximum discharge rate of 2.0 CFS for up to a two-year storm, s maximum discharge rate of 3.27 CFS between a two-year storm and a ten-year storm, a maximum discharge rate of 5.731 CFS between a ten-year storm and a twenty-five year storm, and a discharge rate of 7.97 CFS for between a twenty-five year storm and a fifty-year storm. If the storm intensity exceeds a 50-year storm, the design of the storm water management system results in the storage chamber becoming full and unable to accept additional storm water at a rate exceeding the maximum discharge rate of the system. Excess storm water that cannot be stored in the storage chamber is then allowed to discharge from the system without limit.

Increasing the allowed discharge rate with storm severity enables use of smaller storage chambers, with substantial cost savings.

Lang et al. U.S. Pat. No. 9,309,989 and Lang et al. U.S. Pat. No. 9,290,923, each assigned to the assignee of this application and incorporated by reference as if fully set forth herein, disclose storm water management systems and related flow control devices that better approach the performance of an ideal system. Although the systems and devices disclosed in the '989 and '923 patents offer design flexibility and work well, there is always a need to provide more options for optimizing performance of a storm water management system for a given land use situation.

BRIEF SUMMARY OF THE DISCLOSURE

Disclosed is a storm water management system that includes a flow control device that enables the system to approach the performance of an ideal system even when the maximum discharge rate is stepped or otherwise changes as a function of storm intensity.

Furthermore, the flow control device can be used in both above-ground and below-ground storm water management systems. The flow control device can be used in new construction, or can be retro-fitted to existing storm water management systems. Portions of the flow control device can be prefabricated, with project-specific components easily added later or on-site.

The flow control device in embodiments of the disclosed system includes a valve fluidly disposed between a storm water storage chamber and a discharge of the system. The valve has a movable valving member and a fixed valving member. The valving members cooperate with one another to define a variably-sized orifice disposed between the storage chamber and the discharge. The orifice can be located at either an intake end of the valve, a discharge end of the valve, or the orifice can include orifice portions at both the intake and discharge ends of the valve.

The size or flow area of the discharge orifice is a function of the relative position of the two valving members with respect to one another. The movable valving member is operatively connected to a float whose position in the storage chamber is a function of the water level in the chamber.

The discharge orifice discharges into a discharge pipe that flows storm water out of the storage chamber.

In a first set of embodiments of the disclosed system the float and the movable valving member are connected together by a scissors mechanism. The scissors mechanism converts movement of the float to movement of the movable valving member. In this first set of embodiments the scissors mechanism is attached between the float and the valving member in a number of different ways. The movable valving member in some embodiments moves parallel with the float movement. In other embodiments the movable valving member moves transverse to the float movement.

In a second set of embodiments of the disclosed system each valving member has a thickness and a through opening extending through the thickness of the member. The movable valving member overlays the fixed valving member. The through openings overlay one another throughout a range of relative motion of the movable member with respect to the fixed valving member. The overlaying through openings cooperate with one another to define the instantaneous flow area of the valve discharge orifice as a function of the relative positions of the valving members.

The rate of change of the flow area at any given instant may be zero (that is, the instantaneous rate of change of the flow area is zero and so the flow area is constant), positive (that is, the instantaneous rate of change of the flow area is positive and the flow area is increasing), or negative (that is, the instantaneous rate of change of the flow area is negative and the flow area is decreasing). The rate of change of the flow area may effectively be discontinuous, that is, the discharge size may exhibit a step change having a non-continuous increase or decrease in flow area.

The discharge orifice flow area as a function of float displacement of the valve can be defined by the engineer through the design of the through openings of the valving members. Step changes in orifice flow area for example may accommodate step changes in discharge rates allowed by a jurisdiction as a function of storm severity.

In some embodiments of the second set of embodiments the fixed valving member is attached to the intake end of the discharge pipe. The through opening of the fixed valving member discharges directly into the intake end of the discharge pipe.

The cross sectional area of the discharge opening of the fixed valving member defines the largest possible flow area of the discharge orifice.

The movable valving member through opening discharges into the fixed valving member through opening. The movable valving member through opening extends in the direction of the relative movement of the movable valving member. The fixed valving member through opening continuously becomes located over a different portion of the movable valving member through opening as the float moves between raised and lowered positions. In this embodiment the instantaneous flow area of the discharge orifice is defined by the flow area of the movable valving member through opening portion being overlaid by the fixed valving member through opening. The movable valving member through area narrows or widens along the direction of relative movement to vary the valve orifice size with float displacement as desired.

In some embodiments of the second set of embodiments the valve discharge opening defined by the cooperating valving member through openings may be zero (closing the orifice) for some position or relative range of positions of the valving members. For example, the valve may remain closed until the float has raised some predetermined amount after the start of a storm event and thereby delay initial storm water discharge from the valve.

The position of the movable valving member through opening relative to the fixed valving member through opening may be offset in the direction of relative displacement to delay the opening of the discharge opening.

The movable and fixed valving members of the second set of embodiments may be formed as tubular members, one valving member being closely received inside the other valving member. Storm water may flow into the inner valving member and flow out the valve member through openings for discharge. The valving members may translate relative to one another along an axis. The valving members may formed as circular cylinders and either translate or rotate relative to each other along or about a common cylinder axis. In yet other possible embodiments the valving members may be formed as flat plates that translate with respect to one another along an axis. In yet further other possible embodiments the valving members may be formed as portions of a sphere that rotate about a common point with respect to one another.

The movable valving member in possible embodiments may be attached to a scissors mechanism, that is, embodiments of the disclosed storm water management system may be members of both the first and second sets of embodiments. In other possible embodiments the movable valving member may be attached to a lever mechanism or other conventional mechanism for converting relative movement of one member to relative movement of another member.

Other objects and features of the disclosure will become apparent as the description proceeds, especially when taken in conjunction with the accompanying drawing sheets.

DETAILED DESCRIPTION

Figure 1:
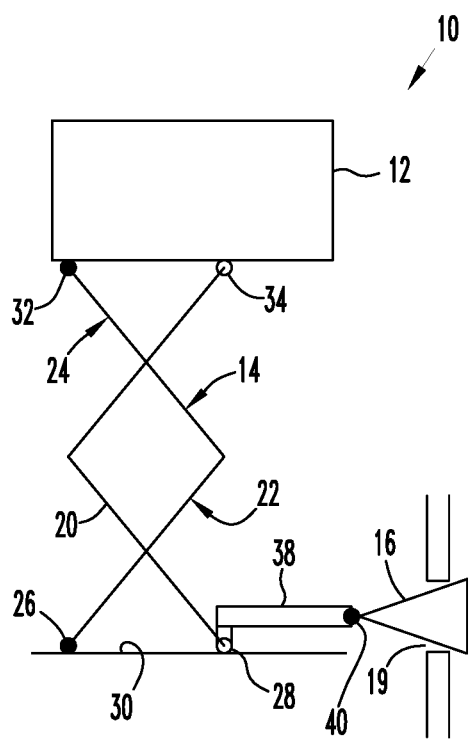
FIGS. 1 and 2 are schematic views of a first embodiment storm water management system.
Figure 2:
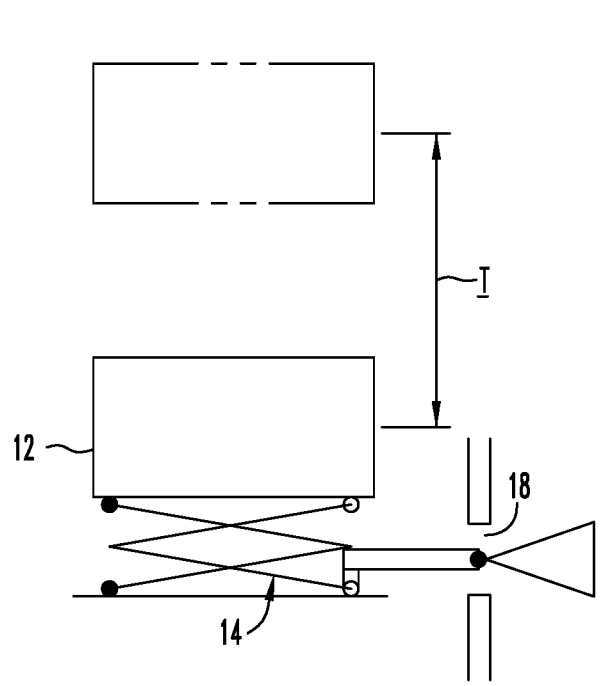

FIGS. 1 and 2 illustrate a portion of a first embodiment storm water management system 10 for managing storm water runoff. The system 10 is intended for placement in a storage chamber (not shown) that receives the storm water. A float 12 is attached to a scissors mechanism 14 that controls the location of a valve body 16 positioned in a chamber discharge 18. The valve body 16 and the discharge 18 cooperate to define a flow orifice 19 that discharges water from the storage chamber through the discharge 18.

The float 12 floats in the storm water and moves vertically up and down with changes in water level within the chamber. FIG. 1 illustrates the float 12 in a raised, uppermost position that occurs when the storage chamber is filled to maximum capacity. FIG. 2 illustrates the float 12 in a lowered, lowermost position that occurs when the storage chamber is essentially empty. The illustrated float 12 floats with the waterline centered between the top and bottom of the float. The float has a vertical displacement T between the uppermost and lowermost positions.

The scissors mechanism 14 is formed from pinned, folding legs 20 arranged in a criss-cross "X" pattern. The illustrated scissors mechanism includes a lower "X" segment 22 and an upper "X" segment 24. The two legs of the bottom "X" segment 22 are pinned and movably supported respectively at leg connections 26, 28 respectively to a floor 30 of the storage chamber or to a fixed shelf within the storage chamber. The two legs of the upper "X" segment 24 are pinned and movably supported at leg connections 32, 34 respectively to a bottom surface 36 of the float 12. Connections 28, 34 include rollers that move horizontally with vertical movement of the float 12.

An arm 38 is attached to the leg connection 28 for conjoint axial movement with the leg connection. The arm 38 extends to an arm joint 40 that connects the arm 38 to the valve body 16 for conjoint axial movement of the valve body 16 with the leg connection 28.

Vertical motion of the float 12 is converted to axial motion of the valve body 16 through axial movement of the leg connection 28 and resulting vertical extension and contraction of the scissors mechanism 14. Axial movement of the valve body as a function of float movement is controlled by the scissors geometry as is already known in the scissors mechanism art and so will not be described in further detail. The design of the scissors mechanism is selected to obtain the desired axial displacement of the valve body given the float travel between filled and empty positions.

When the float rises and the scissors mechanism extends, the valve body 16 moves to the left as viewed in FIG. 1, acting to close the discharge 18 and reduce the flow area of the orifice 19. When the float lowers and the scissors mechanism contracts, the valve body 16 moves in the opposite direction and increases the flow area of the orifice 19.

Figure 3:
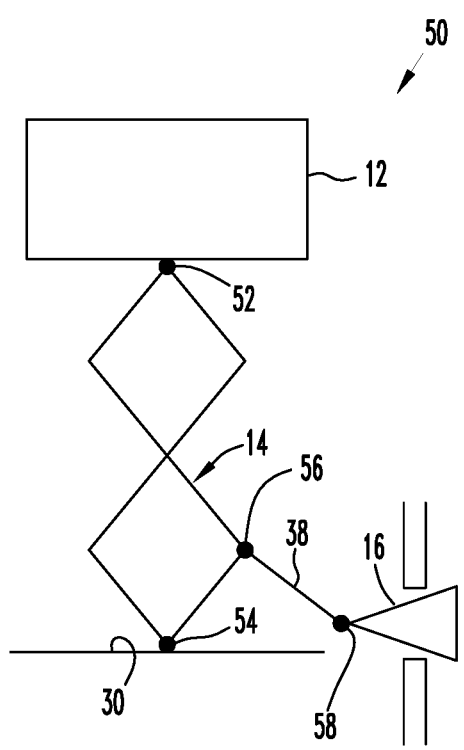
FIGS. 3 and 4 are schematic views of a second embodiment storm water management system.
Figure 4:
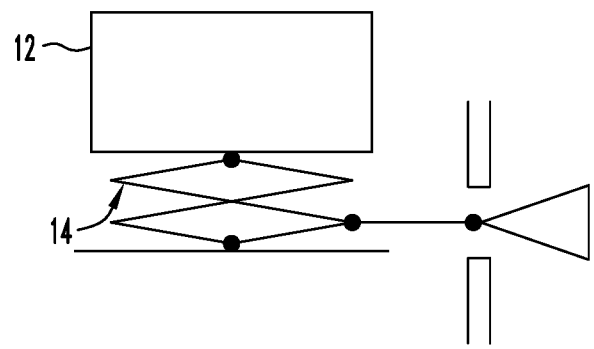

FIGS. 3 and 4 illustrate a portion of a second embodiment storm water management system 50. The system 50 is similar to the system 10 except that the scissors mechanism 14 is pinned to the float 12 at a pin connection 52 and is pinned to the chamber floor 30 at a pin connection 54. Arm 38 is pinned to the scissors pivot joint 56 and extends to a pin connection 58 connecting the arm to the valve body 16. In this embodiment the valve body 16 is constrained for horizontal movement only. Extension and contraction of the scissors mechanism 14 generates axial movement of the valve body 16 through displacement of the arm 38.

Figures 5, 6:
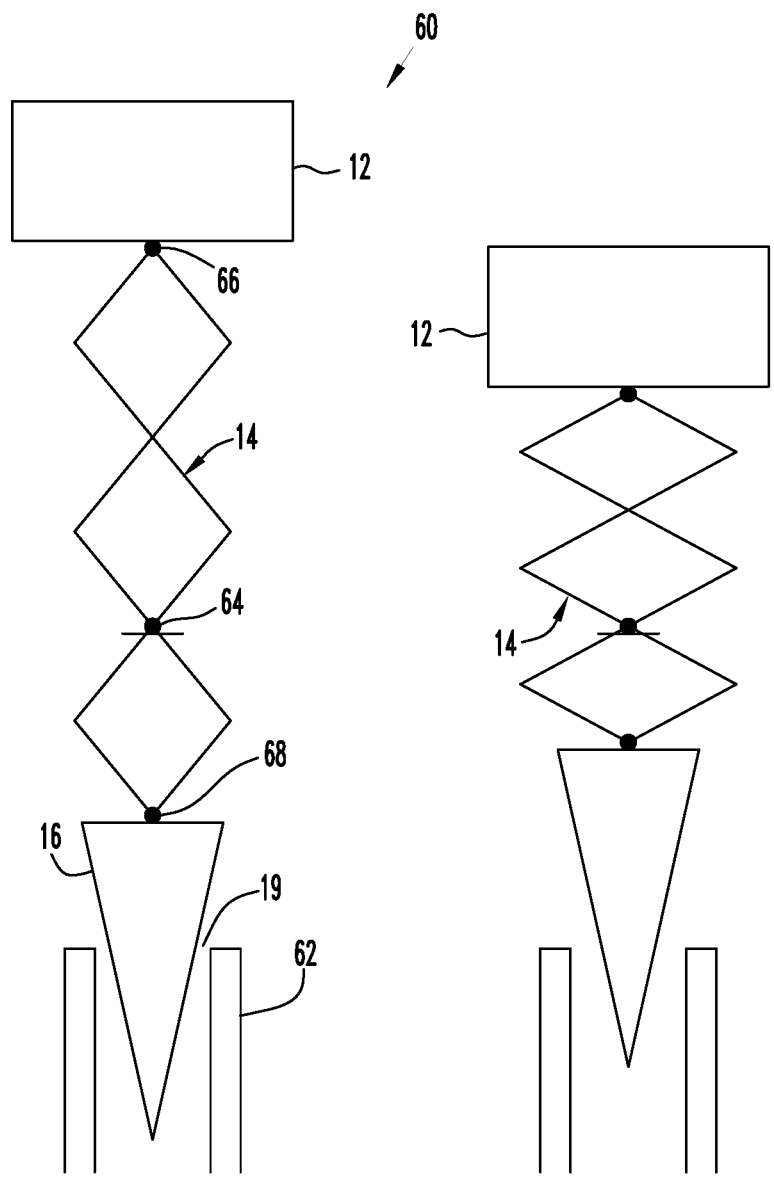
FIGS. 5 and 6 are schematic views of a third embodiment storm water management system.

FIGS. 5 and 6 illustrate a portion of a third embodiment storm water management system 60 that controls the discharge of a vertical discharge pipe 62. An intermediate pin connection 64 of the scissors mechanism 14 is fixed to the storage chamber wall (not shown) against horizontal and vertical movement. The float 12 is attached to upper pin connection 66 and the valve body 16 is attached to lower pin connection 68. The valve body 16 cooperates with the intake end of the discharge pipe 62 to define the flow orifice 19. In this embodiment as the float rises the valve body moves downwards towards the inlet end of the discharge pipe 62, reducing the flow area of the orifice 19. As the float descends the valve body moves upwards away from the inlet end of the discharge pipe 62, increasing the flow area of the flow orifice 19.

Figure 7:
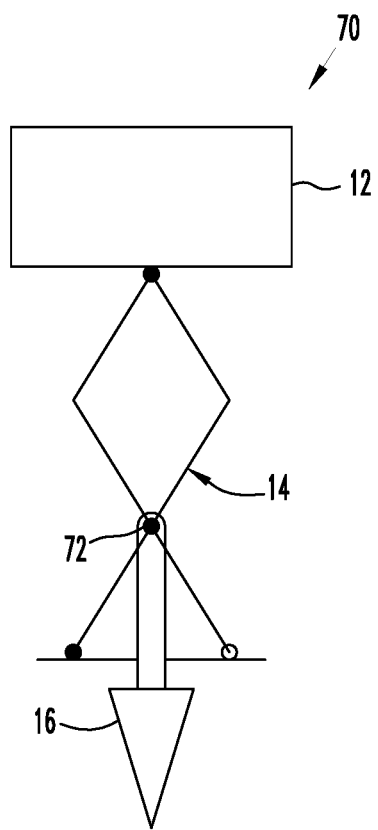
FIGS. 7-9 are respective schematic views of a fourth, fifth, and sixth embodiment storm water management system.
Figure 8:
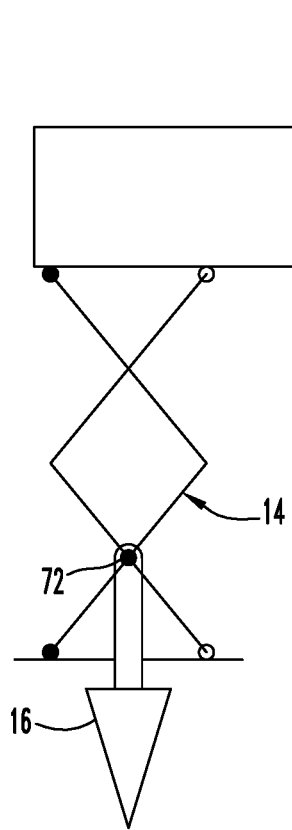
Figure 9:
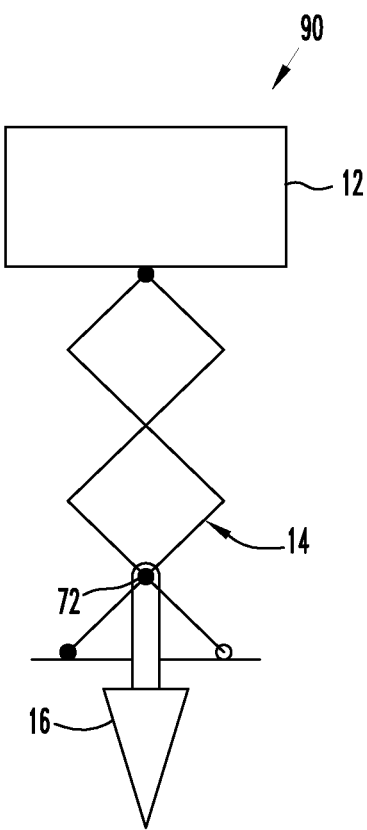

FIGS. 7, 8, and 9 each illustrate a storm water management system 70, 80, and 90 respectively, each system being similar to one another and to the storm water management system 60. In these embodiments the valve body 16 is mounted for vertical movement with the float 12. The valve body 16 is attached to the lower-most pivot link 72 of the scissors mechanism 14. These figures illustrate that the vertical displacement of the valve body 16 for a unit vertical displacement of the float 12 is a function of the number of scissor links between the pivot link 72 and the float 12.

Figure 10:
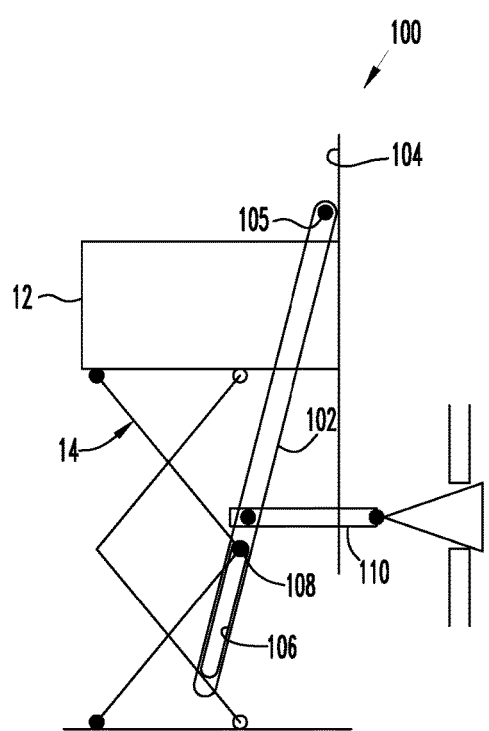
FIGS. 10 and 11 are schematic views of a seventh embodiment storm water management system.
Figure 11:
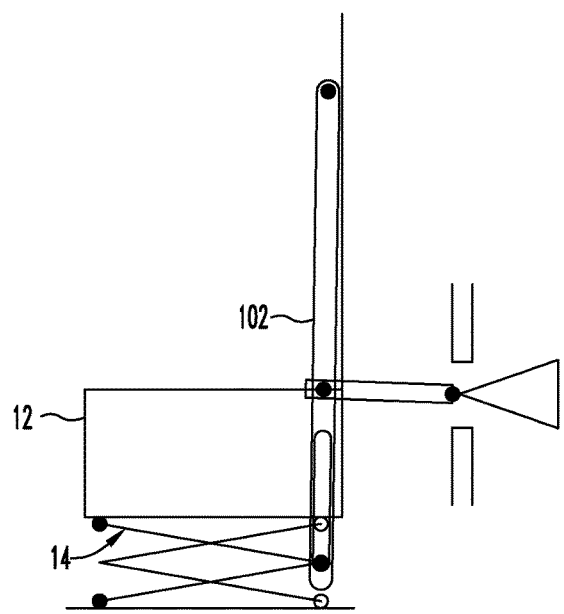

FIGS. 10 and 11 illustrate a portion of a seventh embodiment storm water management system 100. The system 100 is similar to the system 10 shown in FIG. 1. In this embodiment, however, vertical displacement of the float 12 is converted to horizontal displacement of the valve body 16 by a crank arm 102 pivotally attached to the inside wall 104 of the storage unit at upper pivot link 105. The arm 102 has an elongate slot 106 that receives a pivot link 108 of the link mechanism 14. Vertical displacement of the pivot link 108 generated by displacement of the float causes the crank arm to pivot towards or away from the wall 104 as illustrated in the figures. Pivotal movement of the crank arm is converted to horizontal displacement of the valve body 16 by a link 110 pivotally connected to both the crank arm 102 and the valve body 16.

Figure 12:
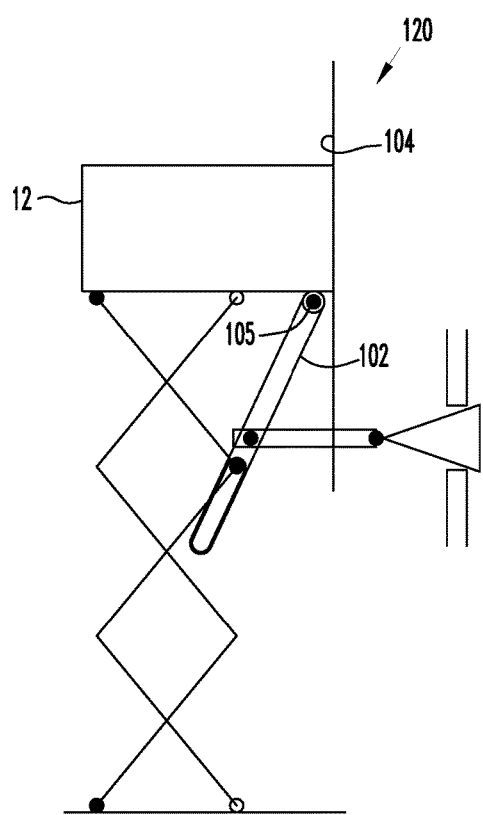
FIGS. 12 and 13 are respective schematic views of an eighth and ninth embodiment storm water management system.

FIG. 12 illustrates a portion of an eighth embodiment storm water management system 120. The system 120 is similar to the system 100 shown in FIG. 10 but the upper pivot link 105 of the crank arm is attached to the bottom of the float 12 adjacent to the wall 104 rather than to the wall 104. The slotted crank arm 102 moves vertically with the float 12 while pivoting about the pivot link 105.

Figure 13:
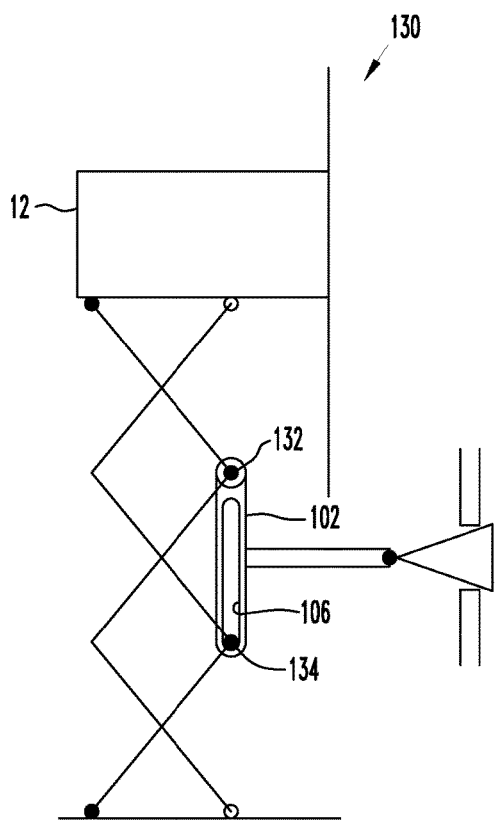

FIG. 13 illustrates a portion of a ninth embodiment storm water management system 130 that is similar to the system 120 shown in the previous figure. The crank arm 102 is pivotally mounted to an upper pivot link 132 of the link mechanism 14 and a lower pivot link 134 is received in the elongate slot 106 of the crank arm. Vertical displacement of the float 12 generates horizontal displacement of the crank arm that is transferred to the valve body.

Figures 14, 15:
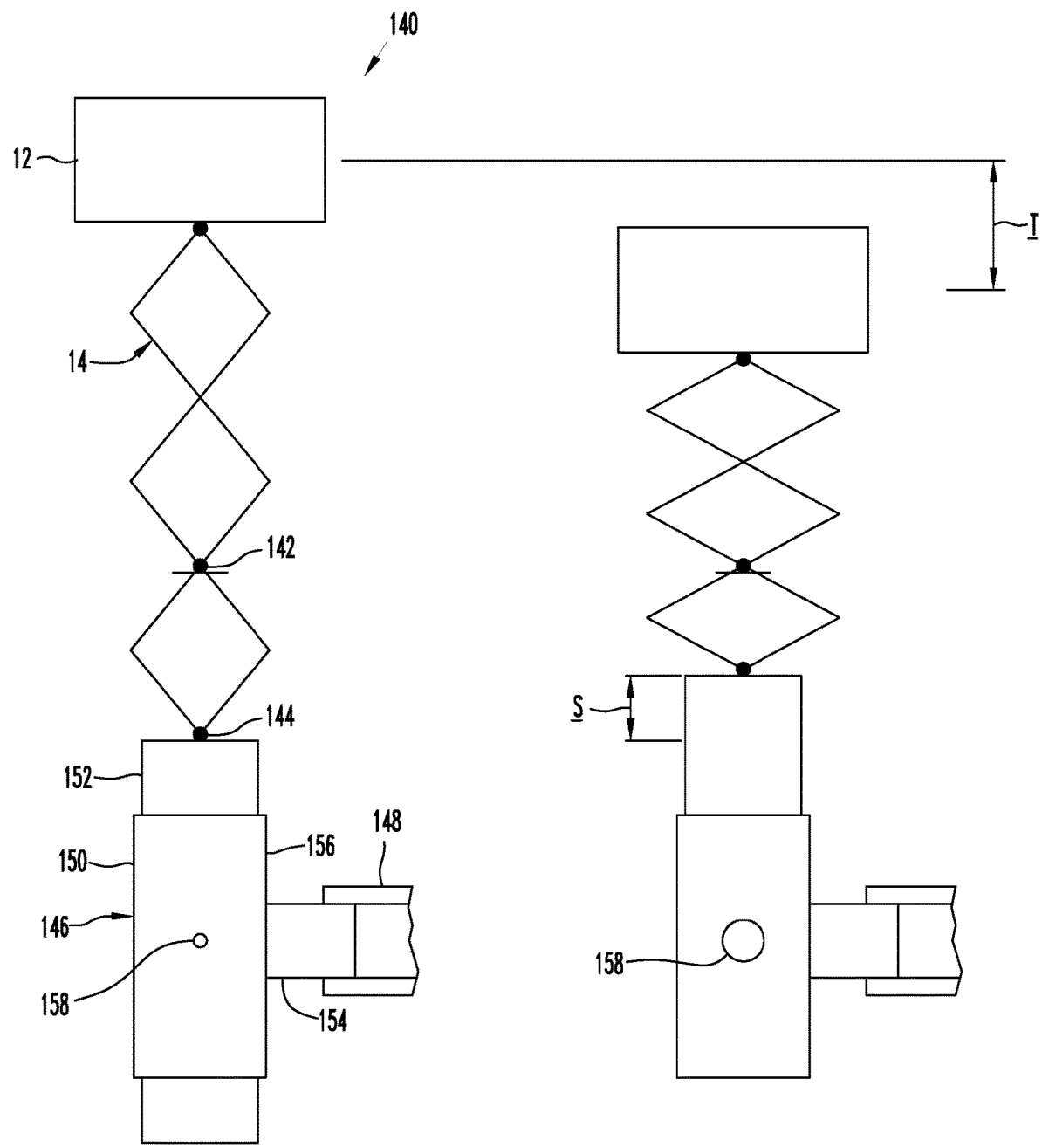
FIGS. 14 and 15 are schematic views of a tenth embodiment storm water system.

FIGS. 14 and 15 illustrate a portion of a tenth embodiment storm water management system 140 that is similar to the system 60 shown in FIG. 5. The pivot link 142 of the scissors mechanism 14 is fixed to the storage chamber wall (not shown) against horizontal and vertical movement. The lower-most pivot link 144 is attached to a valve 146 that discharges storm water in the storage chamber into a discharge pipe 148.

The valve 146 includes a fixed valve housing 150 and a valve body 152 that is vertically movable within the valve housing. The valve housing includes a discharge conduit 154 that discharges the storm water from the valve into the drain pipe 148 and a tubular body 156 that receives the valve body 152.

The valve body 152 is attached to the pivot link 144 for conjoint vertical movement with the pivot link 144. The valve body has a vertical displacement S in response to the float's vertical displacement T. In the illustrated embodiment the valve body moves vertically in the opposite direction of vertical movement of the float. As shown in FIG. 14 the valve body 152 is in its lowered, lowermost position when the float 12 is in its raised, uppermost position. As shown in FIG. 15, the valve body 152 is in its raised, uppermost position when the float 12 is in its lowermost position.

The valve housing body 156 and the valve body 152 cooperatively define a variably-sized flow orifice 158 that receives storm water from the storage chamber into the valve 146. The size of the orifice 158 in the illustrated embodiment varies with vertical movement of the valve body. The flow orifice 158 is shown in FIGS. 14 and 15 as having a larger flow area when the float 12 is in its lowermost position (FIG. 15) as compared to when the float is in its uppermost position (FIG. 14).

The pressure head of the water being received into the flow orifice 158 is a function of water depth in the storage chamber and so is related to the relative vertical location of the float 12 between raised and lowered float positions. The higher the float, the greater the pressure head at the inlet pipe and the greater the discharge rate per unit of orifice area.

Figure 16:
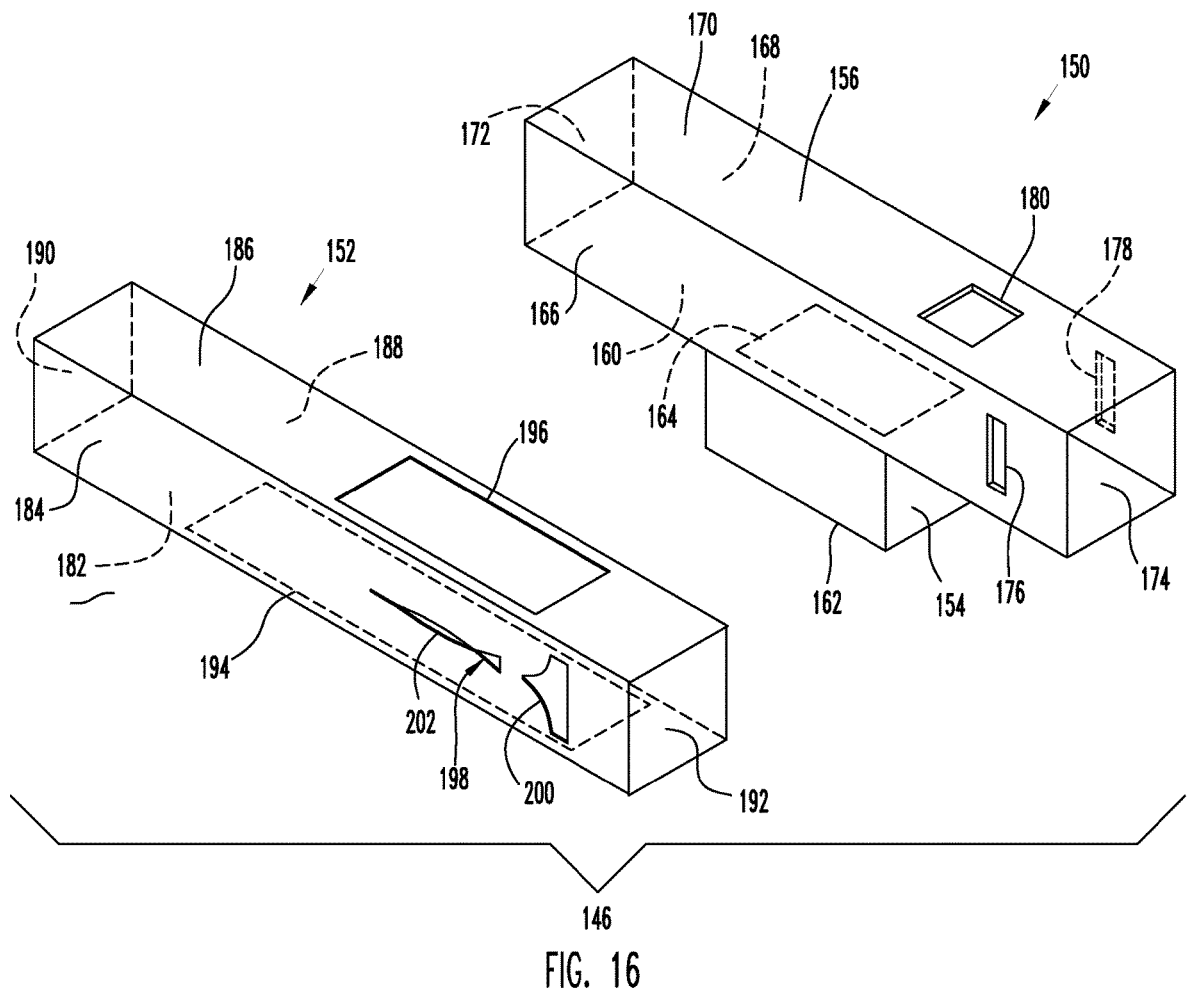
FIG. 16 is an exploded view of the variable-orifice valve of the storm water system shown in FIGS. 14 and 15.

FIG. 16 illustrates the valve 146 with the valve body 152 outside of the valve housing 150.

Referring to the valve housing 150, the discharge conduit 154 is attached to a lower side wall 160 of the body 150 as viewed in FIG. 16. The discharge conduit has a rectangular cross section and extends from a discharge end attached to the body 156 to an open discharge end 162 that discharges the storm water from the body 156. A through-opening 164 in the lower side wall of the housing body 156 receives storm water into the discharge conduit.

The housing body 156 has a generally square cross section. Side walls 160, 166, 168, and 170 extend axially from an open end 172 to an open end 174 of the housing body. A pair of like through openings 176, 178 in the side walls 166, 168 are located near the end 174 directly opposite each other. A through-opening 180 is disposed axially in the side wall 170 between the wall opening 164 and the end 174. The illustrated openings 176, 178, 180 are rectangular openings, but some or all of the openings can be non-rectangular openings in other embodiments.

The valve body 152 has a generally square cross section and is sized to be closely received in the discharge pipe 156. Side walls 182, 184, 186, and 188 extend axially from a closed end 190 to an opposite closed end 192.

The side wall 182 includes a through-opening 194. The opposite side wall 186 includes a through-opening 196. The side wall 184 and the opposite side wall 188 include like through-openings 198 directly opposite each other (to simplify the drawing, the opening in the wall 188 is not shown in FIG. 16). Each opening 198 includes a lower opening portion 200 adjacent the end 192 and an upper opening portion 202 axially spaced away from the opening 200 towards the opposite end of the valve body.

In operation, the valve body 152 is disposed partially inside the valve housing body 156. The valve body sides 182, 186 face the valve housing body sides 160, 170 respectively. The valve body sides 184, 188 face the valve housing body sides 166, 168 respectively.

The valve body openings 196, 198 cooperate with the valve housing body openings 176, 178, and 180 to form and define the variable intake orifice 158. Storm water flowing into the orifice 158 through the valve body housing openings 176, 178 flow through the valve body openings 198 and into the interior of the valve body 152. Storm water flowing into the orifice 158 through the valve housing body opening 180 flows through the valve body opening 196 into the interior of the valve body 152. The valve body opening 194 cooperates with the valve body housing opening 164 in flowing storm water out of the valve body 152 and to the discharge conduit 162 for discharge to the discharge pipe 148.

Figure 17:
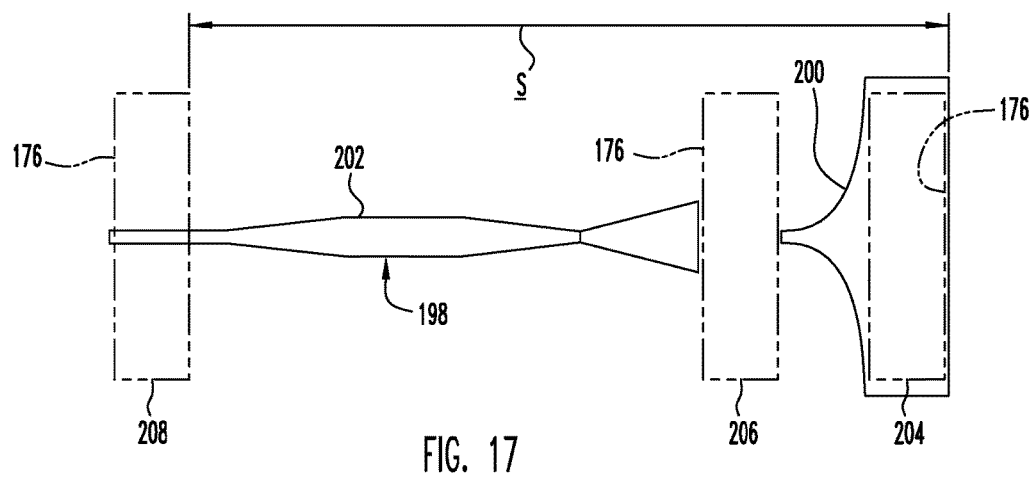
FIG. 17 is a side view of a portion of the variable orifice of the valve shown in FIG. 16.

FIG. 17 illustrates the relative position of the valve housing opening 176 with respect to the valve body opening 200 along the valve body stroke $\underline{S}$. When the float 12 is in its lowermost position and the valve body is in its uppermost position the valve housing body opening 176 is at relative position 204 and is aligned with the lower end of the valve body openings 200. The valve body opening 200 does not obstruct the valve housing body opening 176 and the entire opening 176 is effective in receiving storm water into the valve.

In other possible embodiments the housing body opening 176 may be blocked or partially blocked by the so that less than the full flow area of the valve housing body openings 176, 178 flow water to the outlet 162.

To help clarify the changes in openings along the valve body stroke, the scale of the openings along the valve body are not necessarily drawn to scale.

As the float 12 begins to rise during a rain event, the valve body 152 moves down further into the valve housing body 156. As it moves down, the through openings 176, 178 in the valve housing 152 are exposed to different portions of the valve body openings 200 in the valve body 152. At the lowest float elevation, just as the storm event begins, the position of the movable valve body openings 200 in the valve body, relative to the fixed valve housing opening 176, 178 will be in the position as shown by the overlay 204.

As the float 12 continues to rise during the rain event, the valve body 152 continues to descend into the valve body housing body 156, and valve body openings 200 move relative to the fixed position valve housing openings 176, 178. When the float is at the middle of its travel stroke S, the valve body openings 200 will be in the position relative to the fixed valve housing body openings 176, 178 as shown by position 206.

As explained in more detail below, the illustrated valve 146 is designed for a three-stage multi-storm event (that is, for three different storm intensities storm 1, storm 2, and storm 3). The position 206 corresponds to the transition between the second and third design storms.

When the storm has reached its maximum intensity and the float has reached the top of its design elevation, the valve body openings 200 will be in position 208 relative to the fixed position valve housing openings 176, 178. At this position, the head on the orifice 158 will be at its maximum and the valve housing opening 176, 178 will be completely open for flow because the openings are opposite to the largest open area in the valve body opening 200.

At any time in a storm event, the storm may abate and the system will stop filling and begin to empty. For example, in the case of a storm 1 event only, the system will empty at the storm 1 allowable rate. If the storm has reached the storm 2 stage when it abates, the system will begin to empty at the storm 2 discharge rate and then, after the float has dropped sufficiently, empty at the storm 1 rate until the storage chamber is essentially empty.

The size and shape of the openings 180, 196 are based on the hydraulic head at the orifice, and the minimum flow allowable from the system according to appropriate regulations. The size and shape of the openings forming the orifice 158 are based on the hydraulic head at the respective orifices and the allowable flow rate from the ideal outlet hydrograph.

The valve body opening 196 is positioned to overlay and not obstruct the valve housing body opening 180. The effective flow area of the valve housing body opening 180 to receive storm water into the valve remains constant along the entire stroke of the valve body from its uppermost position to its lowermost position.

The valve body opening 194 is positioned to overlay and not obstruct the valve housing body opening 164 during the entire valve body stroke. The flow area of the valve housing body opening 194 effectively remains constant and equal to the area of the valve housing opening 164 along the entire stroke of the valve body. The effective flow area of the opening 194 remains constant throughout the valve body stroke for discharging storm water out of the valve body and to the discharge conduit 154.

Storm water regulations may allow for successively higher discharge rates as storms intensify. As a result, the ideal hydrograph may be a stepped curve on an outlet graph. The ideal hydrograph should be followed as closely as reasonably possible by the storm water management system to minimize storage system cost and size.

Figure 18:
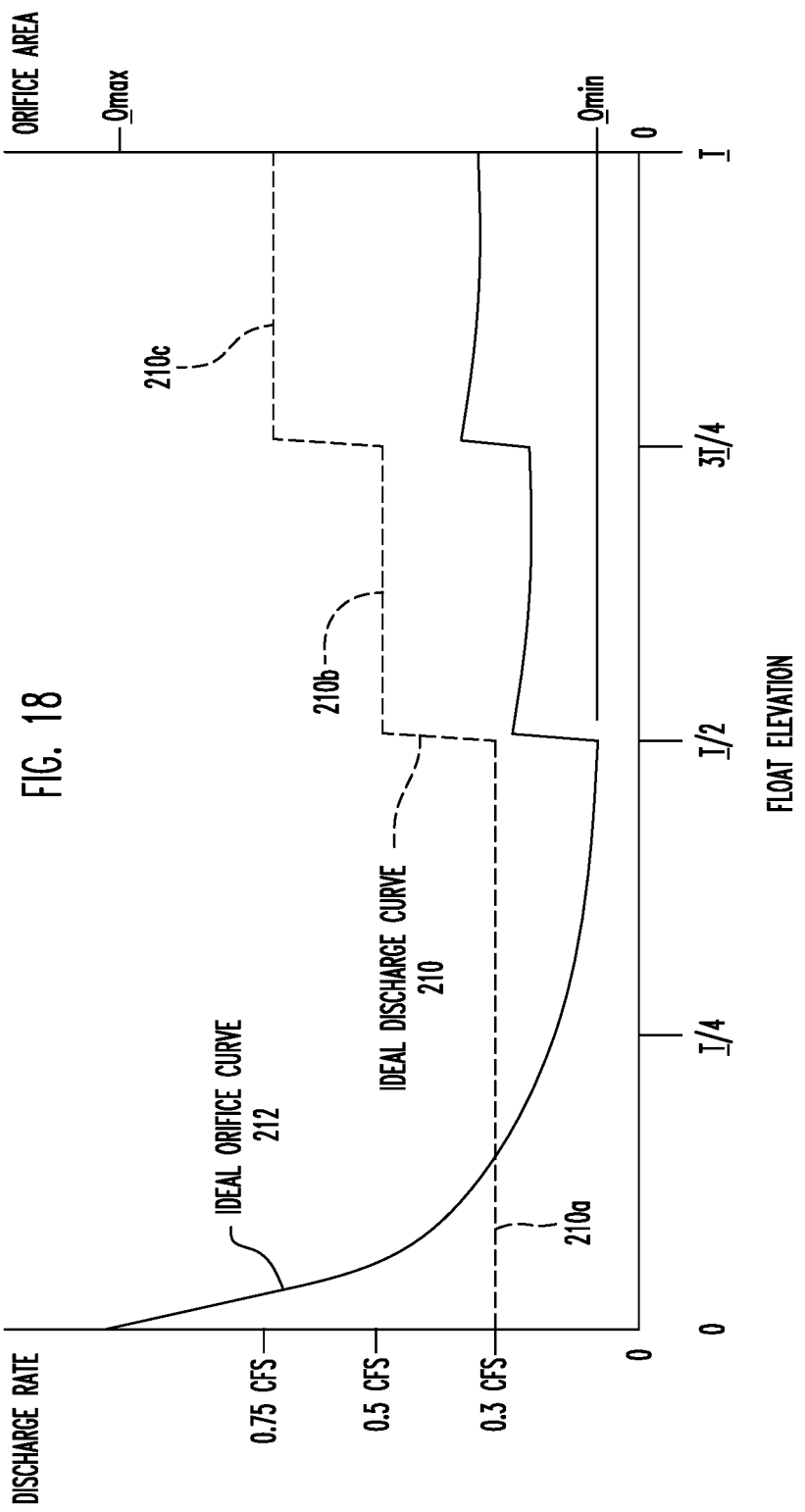
FIG. 18 is a chart showing the ideal orifice size of the valve shown in FIG. 16 for an ideal discharge curve of a multiple-storm level storm event as a function of float elevation of the storm water management system shown in FIGS. 14 and 15.

The valve 146 is designed to closely follow the ideal discharge rate curve 210 shown in FIG. 18. This curve is for illustration only and that the flow rates, locations of step changes in flow rates, and shapes of the curves could vary significantly from the curve 210, in real-life and calculated from real-life data and applicable regulations.

FIG. 18 illustrates an ideal hydrological curve 210 applicable to the storm water management system 140. The ideal outlet hydrograph for a given storm water management system depends on applicable storm water management regulations at the system location, whether a single stage or multi-stage storm event is to be handled, and the intensity of the storm events to be handled by the system. The illustrated ideal hydrological curve 210 is made up of the maximum allowable discharge rates for each storm of the multi-storm event (a 2-year storm, a 10-year storm, and a 25-year storm) applicable by regulation to the storm water management system 140. The storage chamber and the float 12 of the system 140 is designed such that the float is at position 0 when the chamber is empty, is at float position $T/2$ when a storm has reached the intensity of a 2-year storm, is at float position $3T/4$ when the storm has reached the intensity of a 10-year storm, and is at float position $T$ when the storm has reached the intensity of a 25-year storm and the storage chamber is now full.

FIG. 18 also illustrates the corresponding curve 212 of the flow area of the variably-sized flow orifice 158 as a function of float position required for the system 140 to match the ideal discharge rate curve 210.

The ideal discharge rate curve 210 has respective maximum allowable discharge rates 210a, 210b, and 210c associated with the 2-year storm, the 10-year storm, and the 25-year storm respectively. The maximum allowable discharge rate as allowed by regulation makes three step jumps with increasing storm intensity as indicated by the differences in the discharge rates 210a, 210b, 210c. As can be seen in FIG. 18 each step increase in discharge rate has a corresponding step increase in flow area of the valve orifice 159. But because the valve discharge orifice 158 is exposed to an increasing head pressure as the storm event builds and more water is stored in the storage chamber, the flow area of the orifice 158 decreases with continued float rise after each step increase to maintain a substantially constant discharge rate for each storm stage.

The step or discontinuous changes in effective flow area of the valve orifice generates the required step or discontinuous jumps in valve orifice discharge rate and effectively maintains the maximum allowed discharge rate for each storm portion 210a, 210b, 210c. This is why the shape of the valve body opening 200 is "irregular" (that is, not having a uniform constant width along its length and has step or discontinuous changes in width for generating step or discontinuous changes in discharge rate) so as to enable the valve to closely approximate the ideal outlet hydrograph shown in FIG. 18 in response to a storm event, and thereby minimizing the required system storage volume and related costs.

It should be understood that the same principle for changing the effective flow area of the valve discharge orifice as a function of pressure head is also applicable to a storm water management system designed to handle only a single storm event and not a multi-storm or multi-stage storm event.

A maximum discharge rate of 0.3 CFS (indicated as rate 210a in FIG. 18) is allowed for the 2-year storm. This rate 210a is allowed from the beginning of any rainfall event, even if the event never reaches the 2-year storm volume or rate threshold. When the 2-year storm threshold is reached at float elevation $T/2$, the system has retained the difference between the actual inflow and the allowable pre-development 2-year flow rate of 0.3 CFS. This stored storm water volume causes the float elevation to increase from $T0$ to $T/2$.

Once the 2-year storm has been exceeded, even slightly, the maximum allowable discharge rate moves to the maximum discharge rate for the 10-year storm (indicated as rate 210b in FIG. 18), which is 0.5 CFS. The allowable discharge rate remains at 0.5 CFS as the float moves up and beyond the $3T/4$ elevation, at which point the 10-year storm intensity has been exceeded.

Once the 10-year storm intensity threshold has been exceeded, even slightly, the allowable discharge rate becomes the 25-year storm rate (indicated as rate 210c in FIG. 18) of 0.75 CFS. At this point, the system has additionally retained the difference between the actual inflow and the allowable 10-year release rate of 0.5 CFS. This stored storm water volume causes the float elevation to increase from $T/2$ to $3T/4$.

Once the 25-year storm intensity has been reached, the float has moved to the $T$ position (that is, the float has reached its highest position). The storm water management system has stored the maximum capacity of storm water by retaining the difference between the actual inflow and the allowable 25-year storm release rate of 0.75 CFS.

The storm water management system is now completely full. Any additional storm water flow into the system greater than 0.75 CPS will be immediately discharged off from the system via an overflow weir or overflow pipe (not shown).

Looking closer at the example ideal discharge curve 210, the maximum allowed discharge rate for the smallest design storm 1 is 0.3 CFS. When the float elevation reaches $T/2$, a 2-year storm event has occurred and the maximum allowed discharge rate increases to 0.5 CFS, corresponding to the next-higher intensity storm (storm 2).

When the float elevation reaches $3T/4$, a 10-year storm event has occurred and the maximum allowed discharge rate increases to 0.75 CFS. When the float elevation reaches $T$, the 25-year storm intensity has been reached and the storm water management system is at full capacity. Any additional storm water flow received into the system that cannot be stored is directly discharged from the system (in addition to the discharge from the orifice 158) without regard to the overall discharge rate from the system.

Looking at an example ideal orifice curve 212, the ideal orifice size to discharge the allowed maximum flow rate is shown for the pressure head at the valve orifice 158. The ideal orifice area is initially a maximum area at that minimum float elevation due to the low pressure head at the onset of a rain event. The orifice area decreases as the pressure head increases to maintain a constant 0.3 CFS discharge rate.

When the float elevation approaches $T/2$, the ideal orifice area decreases to a minimum value to maintain the 0.3 CFS discharge rate.

When the float elevation increases beyond $T/2$, the maximum discharge rate increases to 0.5 CFS and the ideal orifice area makes an essentially step increase to generate the step increase in discharge rate. The ideal orifice area then continues to decrease with the increased pressure head to maintain the 0.5 CFS discharge rate. When the float elevation increases to $3T/4$, the maximum discharge rate increases to 0.75 CFS and the ideal discharge orifice area makes another step increase to generate the increased discharge rate. The ideal orifice area again then continues to decrease until the float reaches its uppermost position.

The orifice area/float elevation curve is, within practical limits, infinitely variable. It is based on attempting to match the ideal discharge curve which is computed from applicable regulations for the specific property where the runoff is managed.

The ideal outlet hydrograph as depicted in FIG. 18 can be achieved by designing a custom, project specific orifice pattern in the valve body and a corresponding set of openings in the valve housing that cooperate to vary and change orifice size as the float elevation changes. The custom orifice may be made up of two components, orifice 158 as shown in FIGS. 14 and 15, which is a variably-sized orifice portion of the orifice, and a constant-sized orifice portion made up by openings 180 and 196 in FIG. 16. The orifice portions making up the orifice 158 cooperatively define a variable area orifice whose flow area varies as a function of the float elevation.

Figure 19:
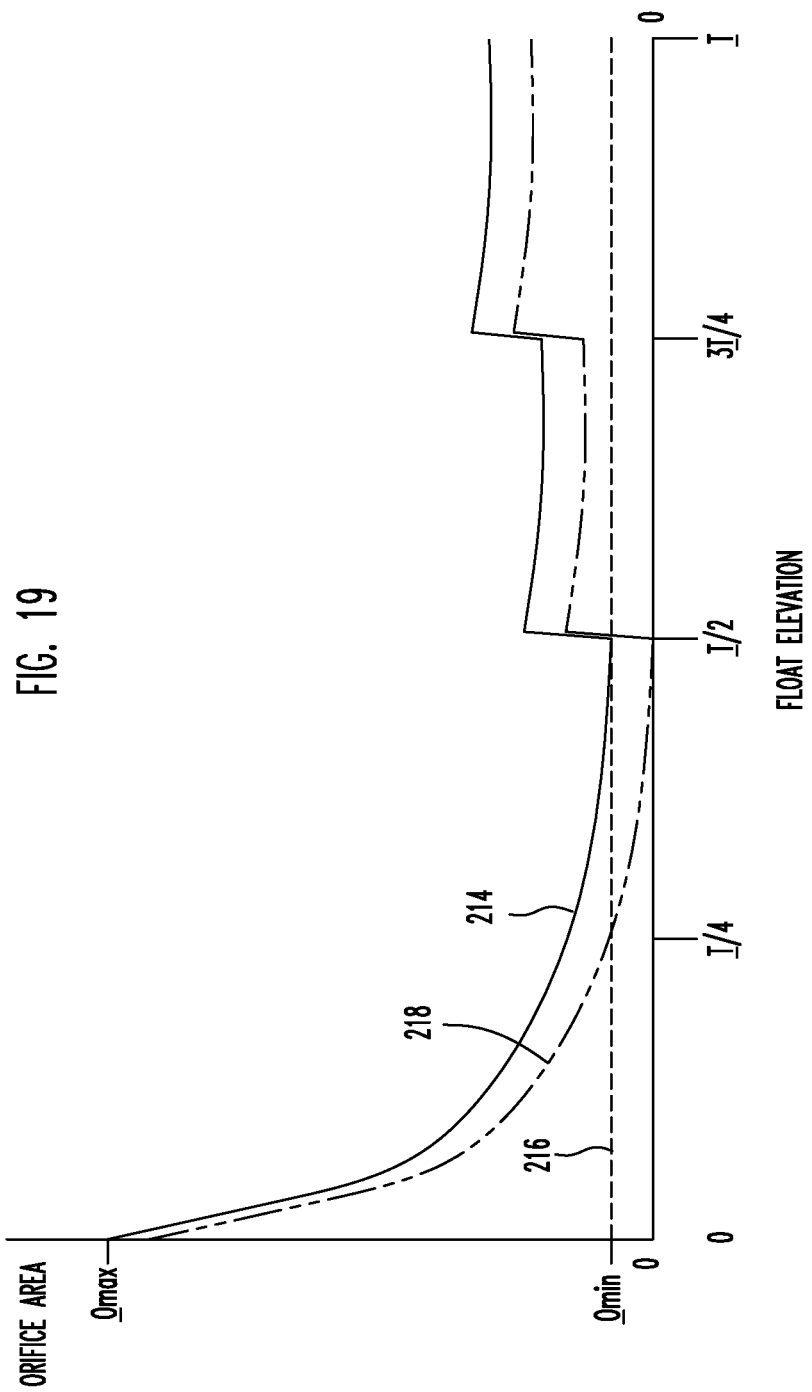
FIG. 19 is a chart showing the fixed and variable portions of the actual orifice size of the valve shown in FIG. 16 as a function of float elevation.

FIG. 19 depicts the flow area 214 of the orifice or valve opening 158 as a function of float position. The valve flow area curve is made up of two components: a fixed or constant flow area component 216 (drawn with a dashed line) and a non-constant or variable flow area component 218 (drawn with a phantom line). The constant and fixed area components of the flow area cooperate additively with one other to define the variable-sized valve opening 159 such that the change in valve opening closely approximates the ideal outlet hydrograph 210 shown in FIG. 18.

The fixed orifice component 216 is formed by the valve housing body opening 180 in cooperation with the valve body opening 196, the openings together effectively defining a fixed-size orifice equal to $O$ min (20.0 square inches for the illustrated embodiment) active throughout the entire stroke of the valve body 152 relative to the valve body housing 156.

The variable orifice component 218 is formed by the valve housing body openings 176, 178 in cooperation with the valve body openings 200, 202, the openings together defining a variable-size orifice. The variable-size orifice changes flow area as a function of float position.

In the illustrated embodiment the variable-size orifice is initially at its largest flow size (the difference in area between $O$max and $O$min) at the beginning of a storm event (the float at 0).

As the storm event continues and the float 12 rises, the variable-size orifice decreases in size and effectively closes when the float reaches $T/2$, indicating the occurrence of a 2-year storm. At this point the flow area of the valve area is $O$min.

As the storm intensity increases beyond the 2-year storm, the flow area of the variable-size orifice effectively has a step increase with further rise of the float to enable the discharge rate to effectively step increase from the 2-year storm discharge rate to the 10-year storm discharge rate. The flow area of the variable size orifice then continually decreases with further float rise to maintain a substantially constant 10-year storm discharge rate.

As the storm event continues the float reaches $3T/4$, indicating the occurrence of a 10-year storm. At this point the flow area of the variable-size orifice is at a local minimum.

As the storm intensity increases beyond the 10-year storm, the flow area of the variable-size orifice has effectively a second step increase with further rise of the float to enable the discharge rate to effectively step increase from the 10-year storm discharge rate to the 25-year storm discharge rate. The flow area of the variable size orifice then continually decreases with further float rise to maintain a substantially constant 25-year storm discharge rate.

As the storm event continues the float eventually reaches $T$, indicating the occurrence of a 25-year storm. The system's storage chamber would now be full and the storm water management system would begin discharging excess storm water received in excess of capacity.

When the storm event abates, the discharge rate emptying the storage chamber would again be a function of float position. The discharge rate would be at the 25-year storm rate as the float fell from $T$ to $3T/4$, at the 10-year storm rate as the float fell from $3T4$ to $T/2$, and at the 2-year storm rate as the float fell from $T/2$ to 0. The fixed orifice would remain fixed in size and the variable-size orifice would have step decreases in size at float positions $3T/3$ and $T/2$ for transition to the decreased allowable discharge rates.

In some embodiments of the valve 146, the housing opening 180 can be sized to be less than $O$min and one or both of the valve housing openings 176, 178 can remain open throughout the valve body stroke to provide the additional flow area needed. The flow areas of each of the pairs of valve housing openings 176 and 178 and of each of the pairs of valve body openings 198 do not necessarily have to equal one another, or may be effectively equal to each other to hydrodynamically balance or mechanically balance hydrodynamic forces acting on the valve 146.

In other embodiments of the valve 146, the valve orifice openings can all define variable-size orifices. For example, the valve housing opening 180 could be eliminated and the flow areas of the valve housing openings 176, 178 can be enlarged to compensate for the loss. The valve body openings 198 would also be enlarged as necessary to approximate the ideal orifice area curve. The variable-sized orifice defined by the openings 176, 178, 198 would then vary in size between $O$min and $O$max while following the ideal hydrographic curve without ever fully closing.

In yet other embodiments, the number of valve openings, the number of valve housing sides, and the axial locations of the valve openings can vary from the illustrated embodiment. The valve 146 can, in alternative embodiments, be designed for non-vertical orientation and actuation, and for the valve body moving in the opposite direction relative to the valve housing from the illustrated embodiment.

The variable orifice 158 in further alternative embodiments can be designed to discharge storm water out of the valve 146 rather than receive storm water into the valve 146. An orifice to receive storm water into the valve 146 in such an embodiment can be a constant-area orifice whose area remains constant regardless of float position.

The valve 146 can be used in storm water management systems in which the valve body 152 is attached to a float by other than a scissors-type mechanism. In other possible embodiments the valve body 152 may be fixed relative to the float and the valve body housing 150 is attached to the float for movement with the float.

Figure 20:
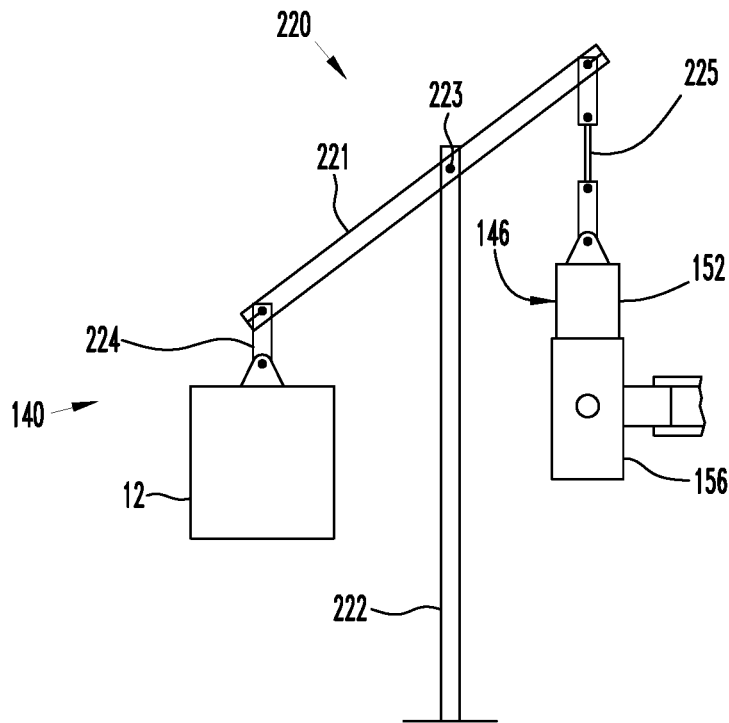
FIG. 20 is a front view of the storm water system shown in FIG. 14 modified to utilize a lever system between the float and the valve, the float in its lowest position.
Figure 21:
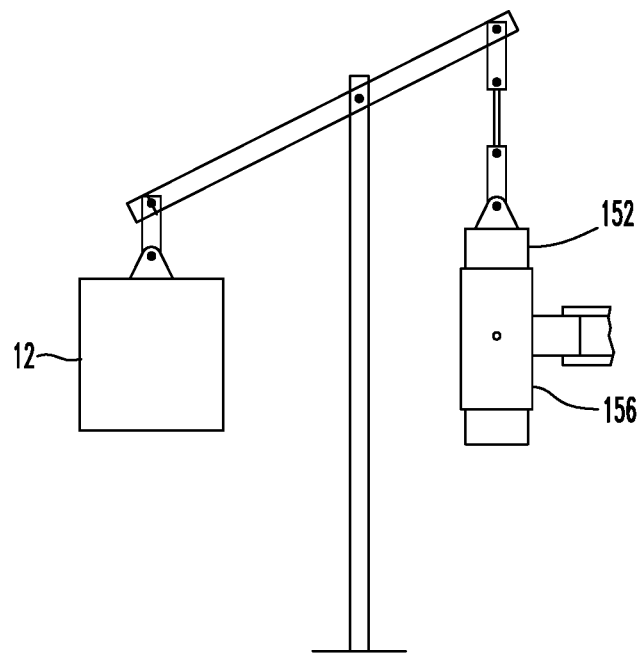
FIG. 21 is similar to FIG. 20 but with the float in the raised position.

FIGS. 20 and 21 illustrate the storm water management system 140 being modified to utilize a lever system 220 that converts axial displacement of the float 12 to relative axial displacement of the valve body 152 and the valve body housing 156 of the valve 146. The valve body housing 156 is fixed relative to the discharge pipe as previously described.

The lever system 220 includes a lever 221 that is pivotally mounted on a fixed vertical column 222 and pivots about a pivot point 223 intermediate of the ends of the lever. The float 12 is attached to one end of the lever by a first link 224. The valve body 152 is attached to the other end of the lever by a second link 225.

FIG. 20 illustrates the lever system 220 with the float 12 in a lower position. FIG. 21 illustrates the lever system with the float in a raised position. Vertical displacement of the float is converted to an opposite vertical displacement of the valve body 152. The vertical displacement ratio of the float with respect to the valving member is established by the relative distances of the links 224, 225 from the pivot point 223.

In the illustrated embodiment the lever 221 does not reach a horizontal position as viewed in FIGS. 20 and 21. In other possible embodiments the lever can reach horizontal and may move past horizontal as the float moves between raised and lowered positions. The lever can also be mounted to a manhole sidewall (not shown).

Figure 22:
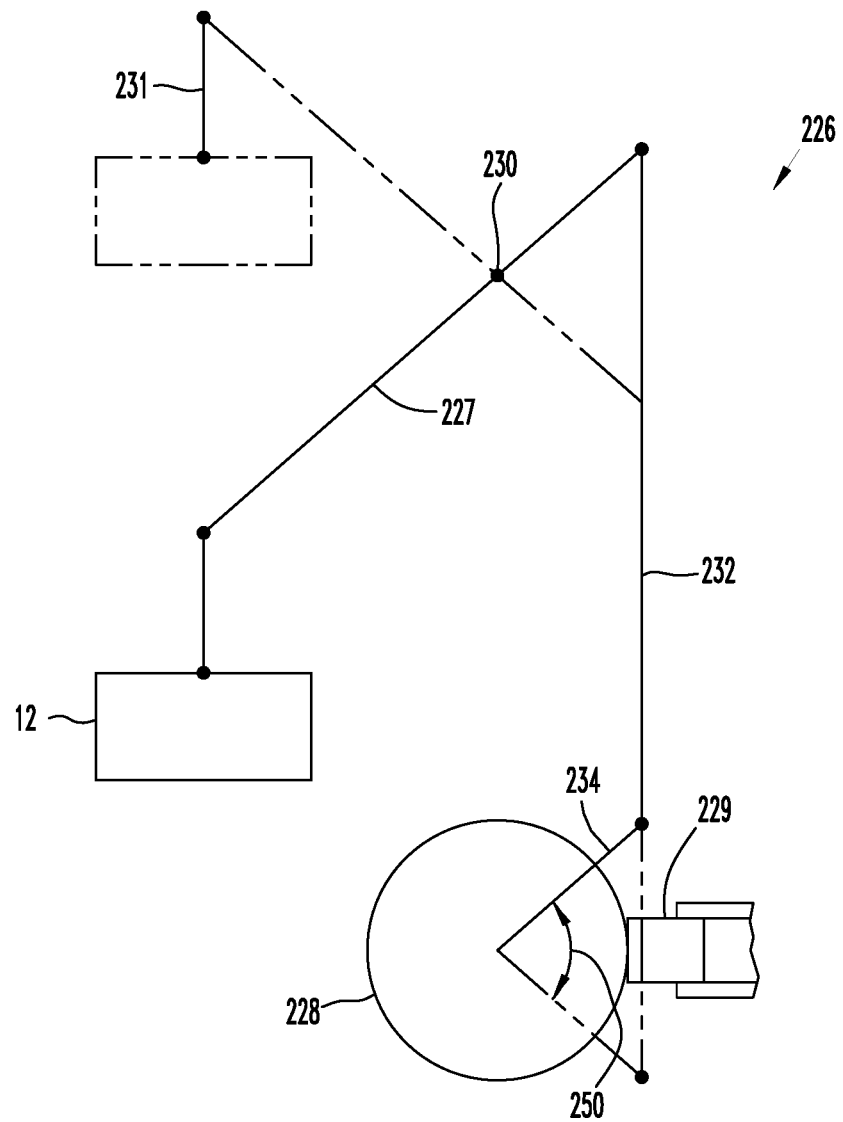
FIG. 22 is a schematic view of an eleventh embodiment storm water system.

FIG. 22 illustrates an eleventh embodiment storm water management system 226 that is similar in principal to the water management system 140. The float 12 is attached to one end of a lever 227. A variable-orifice valve 228 is attached to the other end of the lever that discharges storm water in the storage chamber into a discharge pipe 229. The lever pivots about an intermediate pivot point 230. In this embodiment the valve orifice size varies by relative rotation of the valving members with respect to one another. Relative rotation of the valving members is generated by the pivoting of the lever in response to float movement.

Vertical movement of the float 12 is converted to pivotal movement of the lever 227 by a first link 231 connecting the float to the lever on one side of the pivot point. Pivotal movement of the lever is converted into rotary displacement of the valve 228 by a second link 232 connecting the lever to the valve. The second link is attached to the lever on the other side of the pivot point from the first link. The second link is attached to the free end of a radial valve arm 234 attached to one of the valving members of the valve.

The system 226 is shown in FIG. 22 in solid lines with the float 12 in a lowered position and shown in phantom lines with the float in a raised position. Movement of the float from the lowered to the raised position causes the lever 227 to pivot clockwise as viewed schematically in the figure. The clockwise pivoting of the lever generates corresponding clockwise rotation of the valve arm 234. The rotational displacement of the valve arm as a function of vertical displacement of the float is a function of the relative distances of the lever pivot point from the first and second links and the length of the valve arm.

Figure 23:
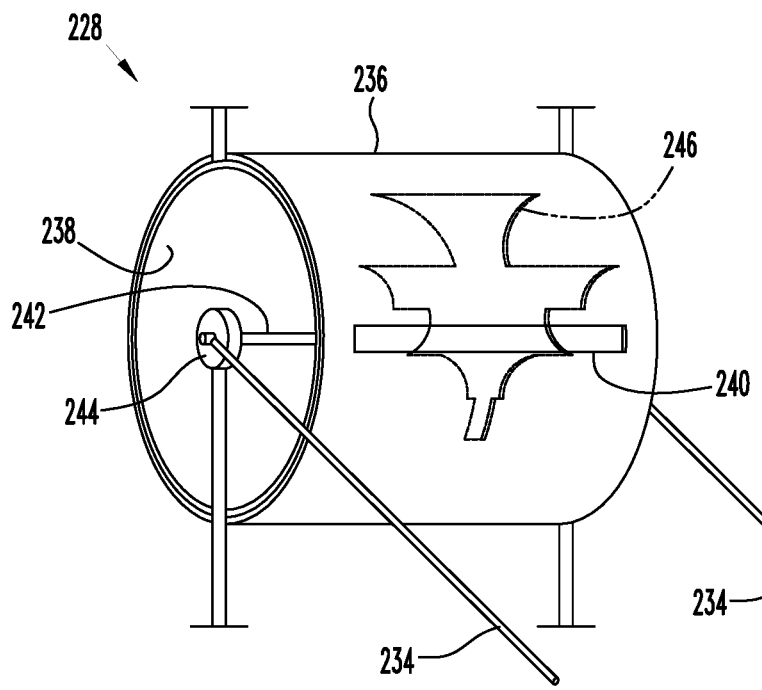
FIG. 23 is a front view of the valve of the storm water system shown in FIG. 22.
Figure 24:
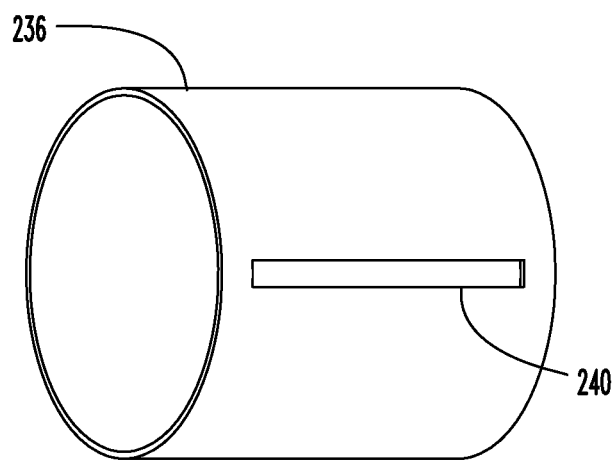
FIG. 24 is a front view of the outer valving member of the valve shown in FIG. 23.
Figure 25:
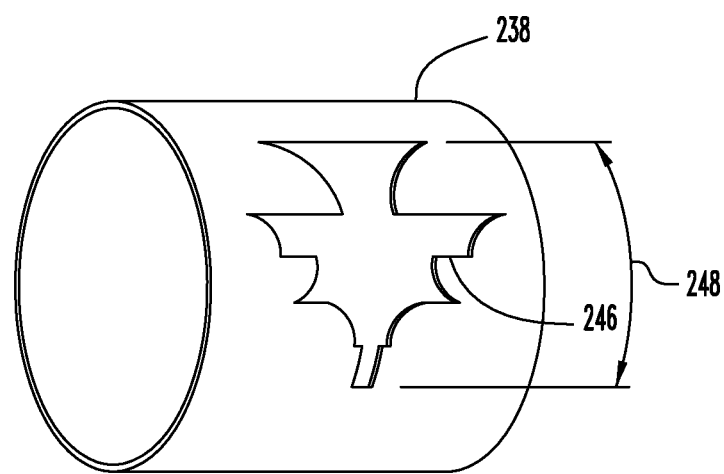
FIG. 25 is a front view of the inner valving member of the valve shown in FIG. 23.
Figure 26:
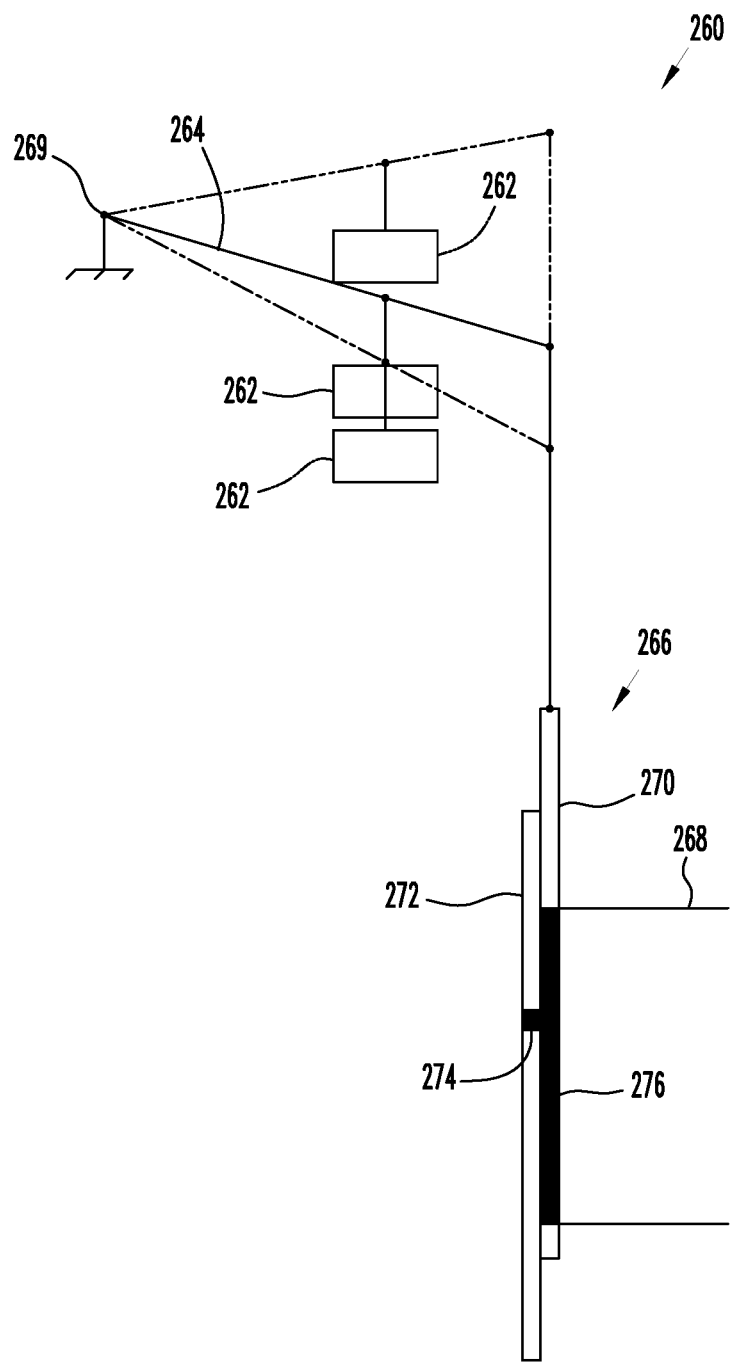
FIG. 26 is a schematic view of a twelfth embodiment storm water system.
Figure 27:
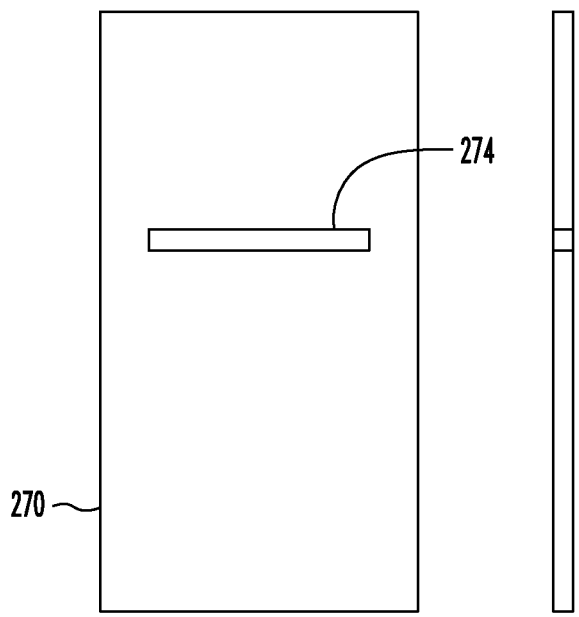
FIG. 27 is a front view of the outer valving member of the valve of the storm water system shown in FIG. 26.
Figure 28:
FIG. 28 is a side view of the valving member shown in FIG. 27.
Figure 29:
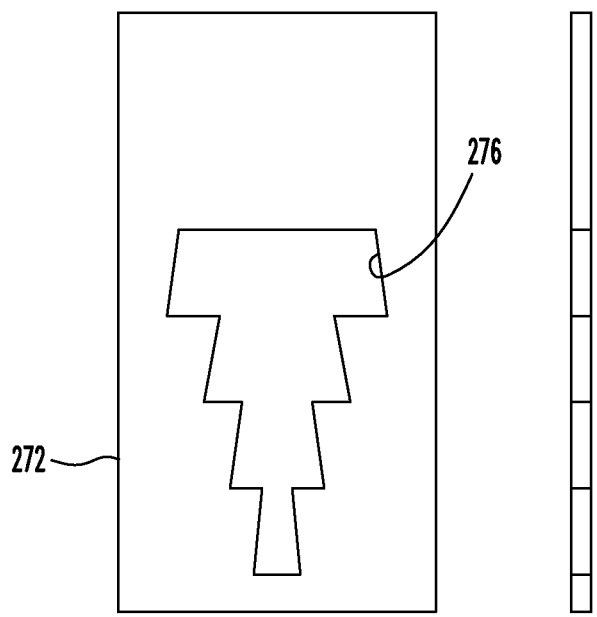
FIG. 29 is a front view of the inner valving member of the valve of the storm water system shown in FIG. 26.
Figure 30:
FIG. 30 is a side view of the valving member shown in FIG. 29.
Figure 31:
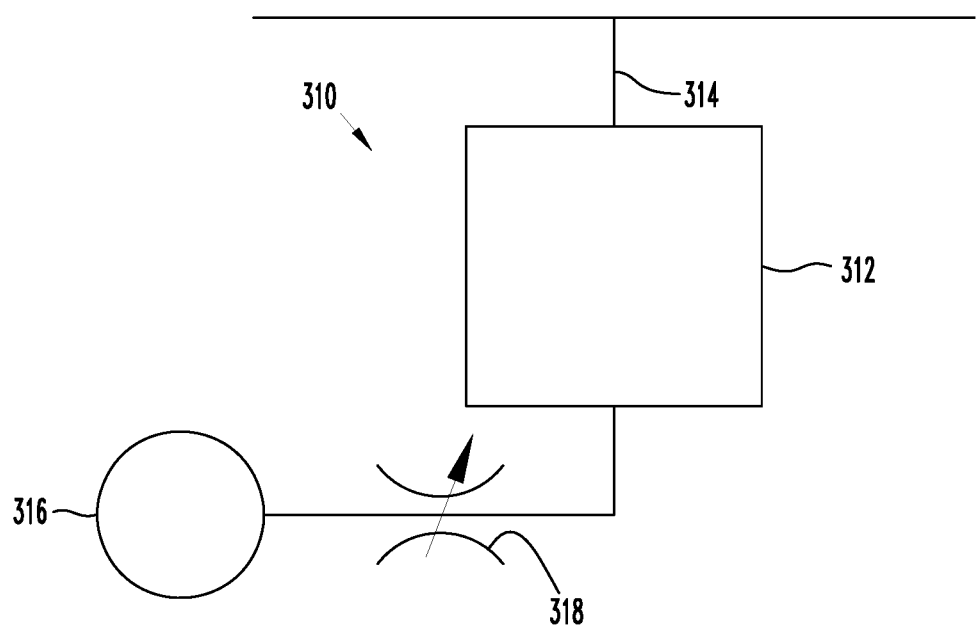
FIG. 31 is a schematic representation of a storm water management system.

FIGS. 23-25 illustrate the valve 228 and its outer and inner valving members 236, 238 respectively. The valving members 236, 238 are both tubular bodies that are coaxial with one another. The inner valving member has one closed end wall (not shown) on one side and an end wall having a discharge opening that communicates the interior of the valving member with the intake end of the discharge pipe 228.

The inner valving member 238 is closely received within the outer valving member 236 but is free to rotate about the common axis with respect to the outer valving member. Storm water is received into the valving members through overlapping intake openings (described in more detail below) and is then discharged into the discharge pipe 229.

The outer valving member 236 is fixedly mounted with respect to the discharge pipe 229. The outer valving member includes a rectangular orifice or through opening 240 centered between the ends of the member. The through opening is disposed closely facing the intake end of the discharge pipe so that storm water discharged from the outer valving member through the opening 240 flows directly into the drain pipe 228. The length of the through opening extends parallel to the common axis. The width of the through opening extends in a circumferential direction about the axis. The illustrated rectangular opening has a relatively slim width-to-length ratio that enables the discharge orifice to be responsive in varying the discharge area as a function of float positon.

The inner valving member 238 is mounted on an axle 242 that extends on the common axis. The axle is mounted for rotation by a pair of bearings 244. The valve arm 234 is formed as pair of like rods 234 extending from the axle and rigidly attached to respective ends of the inner valving member (by welding or the like). Rotation of the valve arm about with the axle causes conjoint rotation of the inner valving member.

The inner valving member has an orifice or through opening 246 centered between the ends of the inner valving member. The opening 246 has a circumferential width 248 about the axis and a length parallel to the axis that varies along the width of the opening as best seen in FIG. 25.

As shown in FIG. 23 the outer valve opening 240 overlays the inner valve opening 246. The outer valve opening and the inner valve opening cooperate with one another to define the flow area of an intake orifice of the valve 226 that determines the discharge rate from the valve 228. The axial length of the outer valve member limits the maximum possible orifice size of the valve. The axial length of the inner valve member is typically less than the length of the outer valve member whereby the relative angular position of the inner valving member with respect to the outer valving member defines the instantaneous flow area of the discharge opening of the valve.

That is, the openings 240, 246 cooperatively define a variable-size orifice that is the sole orifice of the valve 228 and in which the orifice area varies between the minimum and maximum flow areas of the valve as a function of relative rotation of the valving members.

The illustrated discharge orifice of the valve 228 is designed for a 5-stage storm event. The step changes in orifice discharge rate caused when transitioning from one rain event intensity to another is evidenced by the discontinuous changes in length of the inner valve opening 246.

Referring back to FIG. 22, the float 12 is shown in its lowest position prior to a storm event. The free arm 234 is shown as a solid line at its corresponding highest position. The float is shown in phantom lines at the highest position of the float. The free arm is shown as a phantom line at its corresponding lowest position. Vertical displacement of the float causes corresponding angular displacement of the inner valving member as indicated by the angular range of motion 250 of the free arm between its raised, uppermost position (solid line) and its lowered, lowermost position (phantom line).

The inner valving member 238 and the outer valving member 236 are arranged such that the rectangular opening 240 overlays the variable opening 246 throughout the range of motion 250 of the inner valving member. The pair of openings thereby define a variable sized orifice in which the orifice size is a function of float position and the corresponding angular position of the inner valving member relative to outer valving member.

The variable through opening cooperates with the uniform rectangular opening to define the instantaneous size of the valve discharge opening with relative displacement (by relative rotation) of the movable valve member in a manner similar to the relative displacement (by relative translation) of the discharge opening 196 along the discharge opening 198 defines the instantaneous size of the discharge opening defined by those openings 196, 198. The length of the variable through opening as a function of angular displacement is calculated so that the storm discharge rate from the valve closely matches the ideal outlet hydrograph as previously described for the valve 146.

FIGS. 26-30 illustrate a twelfth embodiment storm water management system 260 that also operates in a manner similar in principal to the storm water management system 140. A float 12 is attached to an intermediate portion of a lever 264. See FIG. 26. A variable-orifice valve 266 is attached to an outer end of the lever. The valve 266 discharges storm water in the storage chamber into a discharge pipe 268.

The lever 264 pivots about a pivot point 269 on the other end of the lever. The float and the lever are shown in phantom lines in FIG. 25 with the float in lowered and raised positions, and in solid lines with the float in an intermediate position between the lowered and raised positions.

In this embodiment the valve discharge orifice size varies by relative translation of an outer valving member 270 with respect to an inner valving member 272 caused by pivoting of the lever in response to float movement. The valving members 270, 272 are shown as positioned when the float is in the intermediate position. The valve discharge orifice as evidenced by Figure is designed for a four-stage storm event.

As shown in FIGS. 27-30, the valving members 270, 272 are formed as flat plates that cooperate to form the valve 266. The outer valving member 270 includes a rectangular through opening 274. The inner valving member 272 includes a variable width through opening 276. The through opening 274 overlaps the variable width opening 276 throughout the relative range of travel of the valving members whereby the openings 274, 276 cooperatively define a variable-size orifice of the valve 266. The sizes and shapes of the discharge openings 274, 276 are designed so that the storm discharge rate from the valve during a storm event closely matches the ideal outlet hydrograph as previously described.

In yet other possible embodiments the variable-orifice valve may be formed from cooperating first and second valving members that are shaped as a portion of a sphere. The valving members closely overlap one another and are capable of relative rotation with respect to one another about a common center point.

In yet other possible embodiments the variable orifice valve may include orifice portions on both an intake portion of the valve and on a discharge portion of the valve, the two orifice portions acting in series to control the discharge rate from the valve.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

What is claimed is:

1. A storm water management system comprising:
  a storage chamber, a discharge pipe being fluidly connected with the storage chamber that discharges water from the system, and a flow control device;
  the storage chamber defining an interior volume for storage of water in the storage chamber, water when in the storage chamber defining a water level that changes along a vertical axis with changes in the amount of water stored in the storage chamber;
  the flow control device comprising a float being disposed in the storage chamber and a variable orifice valve being disposed in the storage chamber, the valve being fluidly connected in series between the storage chamber and the discharge pipe;
  the float capable of floating in water and movable along the vertical axis in response to changes in water level of the water in the storage chamber, the float movable through a range of motion between a first float position corresponding to a higher water level in the storage chamber and a second float position corresponding to a lower water level in the storage chamber;
  the valve comprising a fixed valving member being stationary with respect to the storage chamber and a movable valving member being movable with respect to the fixed valving member, the movable valving member being connected to the float wherein movement of the float along the vertical axis is converted to relative movement of the movable valving member with respect to the fixed valving member through a range of motion of the movable valving member corresponding to the range of motion of the float;
  one of the valving members being an outer valving member of the valve and comprising a tubular body defining a hollow interior of the tubular body, the tubular body comprising a wall surrounding the interior of the tubular body, the wall comprising an outer surface and an inner surface being separated from the outer surface by a thickness of the wall, the outer surface being an outer surface of the valve and the inner surface facing the interior;
  the outer valving member further comprising a first through-hole and a second through-hole, the first through-hole extending through the thickness of the wall and being disposed to fluidly communicate the interior volume of the storage chamber with the interior of the tubular body, the second through-hole extending through the thickness of the wall and being disposed to fluidly communicate the interior volume of the tubular body with the discharge pipe;
  the other valving member being an inner valving member of the valve, the inner valving member being at least partially disposed in the interior of the outer valving member, the inner valving member being adjacent to and facing the inner surface of the outer valving member, the inner valving member being movable with respect to the outer valving member along the inner surface of the outer valving member during relative movement of the movable valving member with respect to the fixed valving member;

the inner valving member comprising a through-opening extending through the other valving member and having a first through-hole portion being disposed to receive water into the other valving member and a second through-portion being disposed to flow water out of the inner valving member;

the first through-hole of the outer valving member and the first through-hole portion of the inner valving member overlapping one another during relative movement of the inner and outer valving members to enable water being received into the first through of the outer valving member to flow into the first through-hole portion of the inner valving member, the overlapping of the first through-hole and the second through-hole portion cooperatively defining a first flow orifice of the valve;

the second through-hole portion of the inner valving member overlapping the second through-hole of the outer valving member during relative movement of the inner and outer valving members to enable water flowing out of the second-through-hole portion of the inner valving member to flow into the second through-hole of the outer valving member, the overlapping of the second through-hole portion and the second through-hole cooperatively defining a second flow orifice of the valve; and one of the first flow orifice and the second flow orifice being a variable flow orifice comprising a flow area being the net orifice opening defined by the overlapping of the through-holes associated with said variably-sized orifice, the flow area of the variable orifice varying with relative movement of the movable valving member along at least a portion of the range of motion of the movable valving member.

2. The storm water management system of claim 1 wherein the valve comprises a third flow orifice being disposed fluidly in parallel with the variable flow orifice of the valve; and the flow area of the third flow orifice of the valve remains substantially constant with relative movement of the movable valving member throughout the entire range of motion of the movable valving member.

3. The storm water management system of claim 2 wherein the variable flow orifice of the valve opens, then reduces in flow area, and then increases in flow area after reducing in flow area along a portion of the range of motion of the movable valving member.

4. The storm water management system of claim 1 wherein the storm management system is disposed at a geographical location, and the storage chamber, flow control device, and discharge pipe of the system are configured to discharge water from the system in approximation to a predetermined ideal output hydrograph applicable for the location.

5. The storm water management system of claim 1 wherein the movable valving member moves along a direction of motion relative to the fixed valving member when moving relative to the fixed valving member; and the flow area of the variable flow orifice varies in the length dimension along at least a portion of the width dimension of the said variable flow orifice.

6. The storm water management system of claim 5 wherein one of the through-holes associated with the variable flow orifice has a substantially constant length dimension along the entire width dimension of the said one through-hole.

7. The storm water management system of claim 6 wherein the said one of the through holes has a substantially rectangular shape.

8. The storm water management system of claim 1 wherein the variable flow orifice has at least one discontinuous change in flow area with relative movement of the movable valving member along the range of motion of the movable valving member.

9. The storm water management system of claim 8 wherein the the variable flow orifice has a plurality of discontinuous changes in flow area with relative movement of the movable valving member along the range of motion of the movable valving member.

10. The storm water management system of claim 1 wherein the movable valving member translates with respect to the fixed valving member when moving with respect to the fixed valving member.

11. The storm water management system of claim 1 wherein the movable valving member rotates with respect to the fixed valving member when moving with respect to the fixed valving member.

12. The storm water management system of claim 1 wherein the variable flow orifice is cooperatively formed by the first through-hole of the outer valving member and the first through-hole portion of the inner valving member.

13. The storm water management system of claim 1 wherein the variable flow orifice is cooperatively defined by the second through-hole portion of the inner valving member and the second through-hole of the outer valving member.

14. The storm water management system of claim 1 wherein the float is connected to the movable valving member through a lever.

15. The storm water management system of claim 1 wherein the float is connected to the movable valving member through a scissors mechanism.

16. The storm water management system of claim 1 wherein the inner valving member comprises a tubular body defining a hollow interior of the tubular body, the tubular body comprising a wall comprising inner and outer surfaces, the wall surrounding the interior of the tubular body and extending between opposite closed ends of the tubular body, the wall outer surface facing the inner surface of the tubular body of the outer valving member and inner surface being separated from the outer surface by a thickness of the wall, the through-hole of the inner valving member comprising the interior of the tubular body, and the first and second through-hole portion of the inner valving member extending through the wall.

17. A variable orifice valve for a storm water management system of the type that discharges water into a discharge pipe, stores the excess storm water in a storage chamber, and is responsive to movement of a float floating in the storage chamber caused by changes in water level of the water stored in the storage chamber to vary the discharge rate from the system as a function of water level, the valve comprising:

a valve body having an intake opening that receives water into the valve and a discharge opening that discharges water from the valve, and further comprising a movable valving member, a fixed valving member, and a transmission connectable to the float and the moveable valving member;

the movable valving member being movable with respect to the fixed valving member through a range of motion;

the transmission when connected to the float and to the moveable valving member converting movement of the float to the relative movement of the movable valving member;

one of the valving members being an outer valving member of the valve and comprising a tubular body defining a hollow interior of the tubular body, the tubular body comprising a wall surrounding the interior of the tubular body, the wall comprising an outer surface and an inner surface being separated from the outer surface by a thickness of the wall, the outer surface being an outer surface of the valve and the inner surface facing the interior of the tubular body;

the outer valving member further comprising a first through-hole and a second through-hole, the first through-hole spaced from the second through-hole, each of the first and second through-holes extending through the thickness of the wall and being disposed to fluidly communicate the interior volume of the storage chamber with the exterior of tubular body whereby one of the first and second through-holes forms the intake opening of the valve and the other of the first and second through-holes forms the discharge opening of the valve;

the other valving member being an inner valving member of the valve, the inner valving member being at least partially disposed in the interior of the outer valving member, the inner valving member being adjacent to and facing the inner surface of the outer valving member, the inner valving member being movable with respect to the outer valving member along the inner surface of the outer valving member during relative movement of the movable valving member with respect to the fixed valving member;

the inner valving member comprising a through-hole extending through the inner valving member and being disposed to receive water into the inner valving member and to discharge water out of the inner valving member, the through-hole of the inner valving member being disposed in series with the first and second through-holes of the outer valving member whereby water flowing into the intake opening of the valve flows through the inner valving member before being discharged from the discharge opening of the valve;

an end of one of the first and second ends of the outer valving member facing an end of the through-hole of the inner valving member, each end having a respective flow area, the facing ends cooperatively defining a variable-flow orifice formed from said facing ends, the facing ends overlapping one another during relative movement of the inner and outer valving members to enable water to flow through the variable-flow orifice;

the facing ends each of the variable flow orifice defining a flow area of the variable flow orifice, the flow area of the variable flow orifice being the net flow area defined by the facing ends, the flow area of the variable orifice varying with relative movement of the movable valving member along at least a portion of the range of motion of the movable valving member.

18. The variable orifice valve of claim 17 wherein the valve comprises a second flow orifice being disposed fluidly in parallel with the variable flow orifice of the valve; and the flow area of the second flow orifice of the valve remains substantially constant with relative movement of the movable valving member throughout the entire range of motion of the movable valving member.

19. The variable orifice valve of claim 18 wherein the variable flow orifice of the valve is configured to: (a) increase or decrease in flow area, then (b) reverse the prior change in flow area to decrease or increase the flow area, and then (c) reverse again the change in flow area to increase or decrease the flow area along a portion of the range of motion of the movable valving member.

20. The variable orifice valve of claim 17 wherein the transmission comprises a lever connectable to the float and to the movable valving member for converting motion of the float to the relative motion of the movable valving member.

21. The variable orifice valve of claim 17 wherein the transmission comprises a scissors mechanism connectable to the float and to the movable valving member for converting motion of the float to the relative motion of the movable valving member.

22. The variable orifice valve of claim 17 wherein the transmission when connected to the float and the movable valving member converts displacement of the float to relative translation of the movable valving member along an axis with respect to the fixed valving member.

23. The variable orifice valve of claim 17 wherein the movable valving member translates during the relative movement of the movable valving member.

24. The variable orifice valve of claim 17 wherein the transmission when connected to the float and the movable valving member converts displacement of the float to relative rotation of the movable valving member with respect to the fixed valving member about an axis of rotation.

25. The variable orifice valve of claim 24 wherein each of the valving members are shaped as right circular cylinders coaxial with the axis of rotation, the movable valving member rotatable about the axis of rotation with respect to the fixed valving member.

26. The variable orifice valve of claim 17 wherein each of the valving members is shaped as a portion of a sphere having a center of curvature, the centers of curvature of the valving members coincident with one another, the movable valving member rotatable about the center of curvature with respect to the fixed valving member.

27. The variable orifice valve of claim 17 wherein the inner and outer valving members extend along a common axis, and the inner and outer valving members are configured to cooperatively resist relative rotation of the inner and outer valving members with respect to one another about the common axis.

28. The variable orifice valve of claim 17 wherein the movable valving member moves along a direction of motion relative to the fixed valving member when moving relative to the fixed valving member, each facing end of the variable flow orifice extends in a width dimension along the direction of motion and extends in a length direction transverse to the width direction along the direction of motion; and at least one of the facing ends of the variable flow orifice varies in the length dimension along at least a portion of the direction of motion.

29. The variable orifice valve of claim 28 wherein one of the facing ends of the variable flow orifice has a substantially constant length dimension along the entire width dimension of the said one facing end.

30. The variable orifice valve of claim 29 wherein the said one facing end has a substantially rectangular shape.

31. The variable orifice valve of claim 1 wherein the variable flow orifice has at least one discontinuous change in flow area with relative movement of the movable valving member along the range of motion of the movable valving member.

32. The variable orifice valve of claim 31 wherein the the variable flow orifice has a plurality of discontinuous changes in flow area with relative movement of the movable valving member along the range of motion of the movable valving member.

33. The variable orifice valve of claim 1 wherein the valve is configured to discharge water from the storage chamber in approximation to a predetermined ideal output hydrograph.

34. The variable orifice valve of claim 17 wherein the inner valving member comprises a tubular body defining a hollow interior of the tubular body, the tubular body comprising a wall comprising inner and outer surfaces, the wall surrounding the interior of the tubular body and extending between opposite closed ends of the tubular body, the wall outer surface facing the inner surface of the tubular body of the outer valving member and inner surface being separated from the outer surface by a thickness of the wall, the through-hole of the inner valving member comprising the interior of the tubular body.

35. The variable flow orifice valve of claim 17 wherein movable valving member moves along a direction of motion relative to the fixed valving member when moving relative to the fixed valving member;
    each facing end of the variable flow orifice extends in a width dimension along the direction of motion between opposite first and second ends of the facing end; and
    one of the facing ends of the variable flow orifice is disposed between and spaced away from the first and second ends of the other of the facing ends for at least a portion of the range of motion of the movable valving member.

\* \* \* \* \*